(12) United States Patent
Leabman

(10) Patent No.: US 10,164,478 B2
(45) Date of Patent: Dec. 25, 2018

(54) MODULAR ANTENNA BOARDS IN WIRELESS POWER TRANSMISSION SYSTEMS

(71) Applicant: ENERGOUS CORPORATION, San Jose, CA (US)

(72) Inventor: Michael A. Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 15/059,418

(22) Filed: Mar. 3, 2016

(65) Prior Publication Data

US 2017/0187248 A1 Jun. 29, 2017

Related U.S. Application Data

(60) Provisional application No. 62/272,427, filed on Dec. 29, 2015, provisional application No. 62/273,204, filed on Dec. 30, 2015.

(51) Int. Cl.
*H02J 50/20* (2016.01)
*H02J 7/02* (2016.01)
*H01Q 1/02* (2006.01)

(52) U.S. Cl.
CPC ............... *H02J 50/20* (2016.02); *H01Q 1/02* (2013.01); *H02J 7/025* (2013.01)

(58) Field of Classification Search
CPC .. H01Q 1/36; H01Q 1/42; H01Q 1/46; H01Q 3/02; H01Q 3/08; H02J 7/025; H02J 50/20; H02J 50/80; H02J 50/10; H02J 7/04
(Continued)

(56) References Cited

U.S. PATENT DOCUMENTS 787,412 A 4/1905 Tesla
3,167,775 A 1/1965 Guertler
(Continued)

FOREIGN PATENT DOCUMENTS

CN 203826555 U 9/2014
CN 104090265 A 10/2014
(Continued)

OTHER PUBLICATIONS

Energous Corp., ISRWO, PCT/US2014/037170, dated Sep. 15, 2014, 11 pgs.
(Continued)

*Primary Examiner* — John Poos
(74) *Attorney, Agent, or Firm* — Morgan, Lewis & Bockius LLP

(57) ABSTRACT

An antenna board for wirelessly delivering power, including a connector configured to: (i) connect with any one of a plurality of electrical ports of a transmitter board, including a first electrical port of the plurality of electrical ports, and (ii) receive an electrical signal from the first electrical port when the connector is connected with the first electrical port. The antenna board further includes antenna element(s) configured to, when the connector is connected with the first electrical port, transmit radio frequency (RF) power transmission waves using the electrical signal received from the first port. Each of the RF power transmission waves constructively interferes with at least one other RF power transmission wave of the RF power transmission waves at a receiver within a transmission field of the antenna board and energy from the RF power transmission waves is used by the receiver to power and/or charge the receiver.

19 Claims, 12 Drawing Sheets

(58) Field of Classification Search
USPC .......................................................... 307/104
See application file for complete search history.

(56) References Cited

U.S. PATENT DOCUMENTS

| | | | |
|---|---|---|---|
| 3,434,678 A | 3/1969 | Brown et al. | |
| 3,696,384 A | 10/1972 | Lester | |
| 3,754,269 A | 8/1973 | Clavin | |
| 4,101,895 A | 7/1978 | Jones, Jr. | |
| 4,360,741 A | 11/1982 | Fitzsimmons et al. | |
| 4,944,036 A | 7/1990 | Hyatt | |
| 4,995,010 A | 2/1991 | Knight | |
| 5,200,759 A | 4/1993 | McGinnis | |
| 5,211,471 A | 5/1993 | Rohrs | |
| 5,548,292 A | 8/1996 | Hirshfield et al. | |
| 5,556,749 A | 9/1996 | Mitsuhashi et al. | |
| 5,568,088 A | 10/1996 | Dent et al. | |
| 5,646,633 A | 7/1997 | Dahlberg | |
| 5,697,063 A | 12/1997 | Kishigami et al. | |
| 5,712,642 A | 1/1998 | Hulderman | |
| 5,936,527 A | 8/1999 | Isaacman et al. | |
| 5,982,139 A | 11/1999 | Parise | |
| 6,046,708 A | 4/2000 | MacDonald, Jr. et al. | |
| 6,127,799 A | 10/2000 | Krishnan | |
| 6,127,942 A | 10/2000 | Welle | |
| 6,163,296 A | 12/2000 | Lier et al. | |
| 6,289,237 B1 | 9/2001 | Mickle et al. | |
| 6,329,908 B1 | 12/2001 | Frecska | |
| 6,421,235 B2 | 7/2002 | Ditzik | |
| 6,437,685 B2 | 8/2002 | Hanaki | |
| 6,456,253 B1 | 9/2002 | Rummeli et al. | |
| 6,476,795 B1 | 11/2002 | Derocher et al. | |
| 6,501,414 B2 | 12/2002 | Amdt et al. | |
| 6,583,723 B2 | 6/2003 | Watanabe et al. | |
| 6,597,897 B2 | 7/2003 | Tang | |
| 6,615,074 B2 | 9/2003 | Mickle et al. | |
| 6,650,376 B1 | 11/2003 | Obitsu | |
| 6,664,920 B1 | 12/2003 | Mott et al. | |
| 6,798,716 B1 | 9/2004 | Charych | |
| 6,803,744 B1 | 10/2004 | Sabo | |
| 6,853,197 B1 * | 2/2005 | McFarland | H01Q 1/242 324/549 |
| 6,856,291 B2 | 2/2005 | Mickle et al. | |
| 6,911,945 B2 | 6/2005 | Korva | |
| 6,960,968 B2 | 11/2005 | Odendaal et al. | |
| 6,967,462 B1 | 11/2005 | Landis | |
| 6,988,026 B2 | 1/2006 | Breed et al. | |
| 7,003,350 B2 | 2/2006 | Denker et al. | |
| 7,027,311 B2 | 4/2006 | Vanderelli et al. | |
| 7,068,234 B2 | 6/2006 | Sievenpiper | |
| 7,068,991 B2 | 6/2006 | Parise | |
| 7,183,748 B1 | 2/2007 | Unno et al. | |
| 7,191,013 B1 | 3/2007 | Miranda et al. | |
| 7,196,663 B2 | 3/2007 | Bolzer et al. | |
| 7,205,749 B2 | 4/2007 | Hagen et al. | |
| 7,222,356 B1 | 5/2007 | Yonezawa et al. | |
| 7,274,334 B2 | 9/2007 | o'Riordan et al. | |
| 7,274,336 B2 | 9/2007 | Carson | |
| 7,351,975 B2 | 4/2008 | Brady et al. | |
| 7,359,730 B2 | 4/2008 | Dennis et al. | |
| 7,392,068 B2 | 6/2008 | Dayan | |
| 7,403,803 B2 | 7/2008 | Mickle et al. | |
| 7,443,057 B2 | 10/2008 | Nunally | |
| 7,451,839 B2 | 11/2008 | Perlman | |
| 7,463,201 B2 | 12/2008 | Chiang et al. | |
| 7,471,247 B2 | 12/2008 | Saily | |
| 7,535,195 B1 | 5/2009 | Horovitz et al. | |
| 7,614,556 B2 | 11/2009 | Overhultz et al. | |
| 7,639,994 B2 | 12/2009 | Greene et al. | |
| 7,643,312 B2 | 1/2010 | Vanderelli et al. | |
| 7,652,577 B1 | 1/2010 | Madhow et al. | |
| 7,679,576 B2 | 3/2010 | Riedel et al. | |
| 7,702,771 B2 | 4/2010 | Ewing et al. | |
| 7,786,419 B2 | 8/2010 | Hyde et al. | |
| 7,812,771 B2 | 10/2010 | Greene et al. | |
| 7,830,312 B2 | 11/2010 | Choudhury et al. | |
| 7,844,306 B2 | 11/2010 | Shearer et al. | |
| 7,868,482 B2 | 1/2011 | Greene et al. | |
| 7,898,105 B2 | 3/2011 | Greene et al. | |
| 7,904,117 B2 | 3/2011 | Doan et al. | |
| 7,911,386 B1 | 3/2011 | Ito et al. | |
| 7,925,308 B2 | 4/2011 | Greene et al. | |
| 7,948,208 B2 | 5/2011 | Partovi et al. | |
| 8,055,003 B2 | 11/2011 | Mittleman et al. | |
| 8,070,595 B2 | 12/2011 | Alderucci et al. | |
| 8,072,380 B2 | 12/2011 | Crouch | |
| 8,092,301 B2 | 1/2012 | Alderucci et al. | |
| 8,099,140 B2 | 1/2012 | Arai | |
| 8,115,448 B2 | 2/2012 | John | |
| 8,159,090 B2 | 4/2012 | Greene et al. | |
| 8,159,364 B2 | 4/2012 | Zeine | |
| 8,180,286 B2 | 5/2012 | Yamasuge | |
| 8,228,194 B2 | 7/2012 | Mickle | |
| 8,234,509 B2 | 7/2012 | Gioscia et al. | |
| 8,264,101 B2 | 9/2012 | Hyde et al. | |
| 8,264,291 B2 | 9/2012 | Morita | |
| 8,276,325 B2 | 10/2012 | Clifton et al. | |
| 8,278,784 B2 | 10/2012 | Cook et al. | |
| 8,284,101 B2 | 10/2012 | Fusco | |
| 8,310,201 B1 | 11/2012 | Wright | |
| 8,338,991 B2 | 12/2012 | Von Novak et al. | |
| 8,362,745 B2 | 1/2013 | Tinaphong | |
| 8,380,255 B2 | 2/2013 | Shearer et al. | |
| 8,410,953 B2 | 4/2013 | Zeine | |
| 8,411,963 B2 | 4/2013 | Luff | |
| 8,432,062 B2 | 4/2013 | Greene et al. | |
| 8,432,071 B2 | 4/2013 | Huang et al. | |
| 8,446,248 B2 | 5/2013 | Zeine | |
| 8,447,234 B2 | 5/2013 | Cook et al. | |
| 8,451,189 B1 | 5/2013 | Fluhler | |
| 8,452,235 B2 | 5/2013 | Kirby et al. | |
| 8,457,656 B2 | 6/2013 | Perkins et al. | |
| 8,461,817 B2 | 6/2013 | Martin et al. | |
| 8,467,733 B2 | 6/2013 | Leabman | |
| 8,497,601 B2 | 7/2013 | Hall et al. | |
| 8,497,658 B2 | 7/2013 | Von Novak et al. | |
| 8,552,597 B2 | 8/2013 | Song et al. | |
| 8,558,661 B2 | 10/2013 | Zeine | |
| 8,560,026 B2 | 10/2013 | Chanterac | |
| 8,604,746 B2 | 12/2013 | Lee | |
| 8,614,643 B2 | 12/2013 | Leabman | |
| 8,621,245 B2 | 12/2013 | Shearer et al. | |
| 8,626,249 B2 | 1/2014 | Kuusilinna et al. | |
| 8,629,576 B2 | 1/2014 | Levine | |
| 8,653,966 B2 | 2/2014 | Rao et al. | |
| 8,674,551 B2 | 3/2014 | Low et al. | |
| 8,686,685 B2 | 4/2014 | Moshfeghi | |
| 8,712,355 B2 | 4/2014 | Black et al. | |
| 8,712,485 B2 | 4/2014 | Tam | |
| 8,718,773 B2 | 5/2014 | Wills et al. | |
| 8,729,737 B2 | 5/2014 | Schatz et al. | |
| 8,736,228 B1 | 5/2014 | Freed et al. | |
| 8,760,113 B2 | 6/2014 | Keating | |
| 8,770,482 B2 | 7/2014 | Ackermann et al. | |
| 8,772,960 B2 | 7/2014 | Yoshida | |
| 8,823,319 B2 | 9/2014 | Von Novak, III et al. | |
| 8,832,646 B1 | 9/2014 | Wendling | |
| 8,854,176 B2 | 10/2014 | Zeine | |
| 8,860,364 B2 | 10/2014 | Low et al. | |
| 8,897,770 B1 | 11/2014 | Frolov et al. | |
| 8,903,456 B2 | 12/2014 | Chu et al. | |
| 8,917,057 B2 | 12/2014 | Hui | |
| 8,923,189 B2 | 12/2014 | Leabman | |
| 8,928,544 B2 | 1/2015 | Massie et al. | |
| 8,937,408 B2 | 1/2015 | Ganem et al. | |
| 8,946,940 B2 | 2/2015 | Kim et al. | |
| 8,963,486 B2 | 2/2015 | Kirby et al. | |
| 8,970,070 B2 | 3/2015 | Sada et al. | |
| 8,989,053 B1 | 3/2015 | Skaaksrud et al. | |
| 9,000,616 B2 | 4/2015 | Greene et al. | |
| 9,001,622 B2 | 4/2015 | Perry | |
| 9,006,934 B2 | 4/2015 | Kozakai et al. | |
| 9,021,277 B2 | 4/2015 | Shearer et al. | |
| 9,030,161 B2 | 5/2015 | Lu et al. | |

(56) References Cited

U.S. PATENT DOCUMENTS

| | | |
|---|---|---|
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,806,564 B2 | 10/2017 | Leabman |
| 9,819,230 B2 | 11/2017 | Petras et al. |
| 9,853,361 B2 | 12/2017 | Chen et al. |
| 9,866,279 B2 | 1/2018 | Bell et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1* | 5/2002 | Pande .................... H01Q 1/02 455/67.15 |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1* | 5/2006 | de Rochemont ...... H01Q 1/362 343/700 MS |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0255634 A1 | 11/2007 | Leschin et al. |
| 2007/0273486 A1 | 11/2007 | Shiotsu |

(56) References Cited

U.S. PATENT DOCUMENTS

| | | |
|---|---|---|
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1* | 5/2009 | Nysen ............... H01Q 1/38 375/222 |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |

(56) References Cited

U.S. PATENT DOCUMENTS

| | | |
|---|---|---|
| 2011/0057607 A1 | 3/2011 | Carobolante |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0313835 A1* | 12/2012 | Gebretnsae ........ H01Q 21/0087 343/892 |
| 2012/0326660 A1 | 12/2012 | Lu et al. |
| 2013/0002550 A1 | 1/2013 | Zalewski |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |

(56) References Cited

U.S. PATENT DOCUMENTS

| | | |
|---|---|---|
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |

(56) References Cited

U.S. PATENT DOCUMENTS

| | | |
|---|---|---|
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0181117 A1 | 6/2015 | Park et al. |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |

(56) References Cited

U.S. PATENT DOCUMENTS

| | | |
|---|---|---|
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0294225 A1 | 10/2016 | Blum et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0077733 A1 | 3/2017 | Jeong et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110887 A1 | 4/2017 | Bell et al. |
| 2017/0110914 A1 | 4/2017 | Bell |
| 2017/0134686 A9 | 5/2017 | Leabman |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2018/0040929 A1 | 2/2018 | Chappelle |

FOREIGN PATENT DOCUMENTS

| | | |
|---|---|---|
| DE | 2000216655 U1 | 2/2002 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 A2 | 1/2013 |
| GB | 2404497 A | 2/2005 |
| JP | 2006157586 A | 6/2006 |
| JP | 2007043432 A | 2/2007 |
| JP | 2008167017 A | 7/2008 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| WO | WO 9952173 | 10/1999 |
| WO | WO 200111716 A1 | 2/2001 |
| WO | WO 2003091943 A1 | 11/2003 |
| WO | WO 2004077550 A1 | 9/2004 |
| WO | WO 2006122783 | 11/2006 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

Energous Corp., IPRP, PCT/US2014/037170, dated Nov. 10, 2015, 8 pgs.

Energous Corp., ISRWO, PCT/US2014/041534, dated Oct. 13, 2014, 10 pgs.

Energous Corp., IPRP, PCT/US2014/041534, dated Dec. 29, 2015, 7 pgs.

Energous Corp., ISRWO, PCT/US2014/046956, dated Nov. 12, 2014, 10 pgs.

Energous Corp., IPRP, PCT/US2014/046956, dated Jan. 19, 2016, 7 pgs.

Energous Corp., ISRWO, PCT/US2014/037072, dated Sep. 12, 2014, 8 pgs.

Energous Corp., IPRP, PCT/US2014/037072, dated Nov. 10, 2015, 6 pgs.

Energous Corp., ISRWO, PCT/US2014/068568, dated Mar. 20, 2015, 10 pgs.

Energous Corp., IPRP, PCT/US2014/068568, dated Jun. 14, 2016, 8 pgs.

Energous Corp., ISRWO, PCT/US2014/055195, dated Dec. 22, 2014, 11 pgs.

Energous Corp., IPRP, PCT/US2014/055195, dated Mar. 22, 2016, 9 pgs.

Energous Corp., ISRWO, PCT/US2015/067291, dated Mar. 4, 2016, 10 pgs.

Energous Corp., IPRP, PCT/US2015/067291, dated Jul. 4, 2017, 4 pgs.

Energous Corp., ISRWO, PCT/US2015/067242, dated Mar. 16, 2016, 9 pgs.

Energous Corp., IPRP, PCT/US2015/067242, dated Jun. 27, 2017, 7 pgs.

Energous Corp., ISRWO, PCT/US2015/067243, dated Mar. 10, 2016, 11 pgs.

Energous Corp., IPRP, PCT/US2015/067243, dated Jun. 27, 2017, 7 pgs.

(56) References Cited

OTHER PUBLICATIONS

Energous Corp., ISRWO, PCT/US2014/037109, dated Apr. 8, 2016, 12 pgs.
Energous Corp., IPRP, PCT/US2014/037109, dated Apr. 12, 2016, 9 pgs.
Energous Corp., ISRWO, PCT/US2015/067275, dated Mar. 3, 2016, 8 pgs.
Energous Corp., IPRP, PCT/US2015/067275, dated Jul. 4, 2017, 7 pgs.
Energous Corp., ISRWO, PCT/US2015/067245, dated Mar. 17, 2016, 8 pgs.
Energous Corp., IPRP, PCT/US2015/067245, dated Jun. 27, 2017, 7 pgs.
Energous Corp., ISRWO, PCT/US2014/041546, dated Oct. 16, 2014, 12 pgs.
Energous Corp., IPRP, PCT/US2014/041546, dated Dec. 29, 2015, 9 pgs.
Energous Corp., ISRWO, PCT/US2015/67250, dated Mar. 30, 2016, 11 pgs.
Energous Corp., IPRP, PCT/US2015/67250, dated Mar. 30, 2016, 10 pgs.
Energous Corp., ISRWO, PCT/US2015/067325, dated Mar. 10, 2016, 9 pgs.
Energous Corp., IPRP, PCT/US2015/067325, dated Jul. 4, 2017, 8 pgs.
Energous Corp., ISRWO, PCT/US2014/040697, dated Oct. 1, 2014, 12 pgs.
Energous Corp.,IPRP, PCT/US2014/040697, dated Dec. 8, 2015, 9 pgs.
Energous Corp., ISRWO, PCT/US2014/040705, dated Sep. 23, 2014, 8 pgs.
Energous Corp., IPRP, PCT/US2014/040705, dated Dec. 8, 2015, 6 pgs.
Energous Corp., ISRWO, PCT/US2015/067249, dated Mar. 29, 2016, 8 pgs.
Energous Corp., IPRP, PCT/US2015/067249, dated Jun. 27, 2017, 7 pgs.
Energous Corp., ISRWO, PCT/US2015/067246, dated May 11, 2016, 18 pgs.
Energous Corp., IPRP, PCT/US2015/067246, dated Jun. 27, 2017, 9 pgs.
Energous Corp., ISRWO, PCT/US2014/059317, dated Feb. 24, 2015, 13 pgs.
Energous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 1, 2014, 10 pgs.
Energous Corp., IPRP, PCT/US2014/041323, dated Dec. 22, 2015, 8 pgs.
Energous Corp., ISRWO, PCT/US2014/048002, dated Nov. 13, 2014, 11 pgs.
Energous Corp., IPRP, PCT/US2014/048002, dated Feb. 12, 2015 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp., IPRP, PCT/US2015/067279, dated Jul. 4, 2017, 7 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., IPRP, PCT/US2015/067282, dated Jul. 4, 2017, 6 pgs.
Energous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP , PCT/US2014/045237, dated Jan. 12, 2016, 12 pgs.
Energous Corp., ISRWO , PCT/US2014/054897, dated Feb. 17, 2015, 10 pgs.
Energous Corp., IPRP , PCT/US2014/054897, dated Mar. 15, 2016, 8 pgs.
Energous Corp., ISRWO , PCT/US2015/067334, dated Mar. 3, 2016, 6 pgs.
Energous Corp., IPRP , PCT/US2015/067334, dated Jul. 4, 2017, 5 pgs.
Energous Corp., ISRWO , PCT/US2014/047963, dated Nov. 7, 2014, 13 pgs.
Energous Corp., IPRP , PCT/US2014/047963, dated Jan. 26, 2016, 10 pgs.
Energous Corp., ISRWO , PCT/US2014/054891, dated Dec. 18, 2014, 12 pgs.
Energous Corp., IPRP , PCT/US2014/054891, dated Mar. 15, 2016, 10 pgs.
Energous Corp., ISRWO , PCT/US2014/054953, dated Dec. 4, 2014, 7 pgs.
Energous Corp., IPRP , PCT/US2014/054953, dated Mar. 22, 2016, 5 pgs.
Energous Corp.,ISRWO , PCT/US2015/067294, dated Mar. 29, 2016, 7 pgs.
Energous Corp.,IPRP , PCT/US2015/067294, dated Jul. 4, 2017, 6 pgs.
Energous Corp.,ISRWO , PCT/US2014/062672 dated Jan. 26, 2015, 11 pgs.
Energous Corp., IPRP , PCT/US2014/062672 dated May 10, 2016, 8 pgs.

(56) References Cited

OTHER PUBLICATIONS

Energous Corp.,ISRWO , PCT/US2014/044810 dated Oct. 21, 2014, 12 pgs.
Energous Corp., IPRP , PCT/US2014/044810, dated Jan. 5, 2016, 10 pgs.
Energous Corp., ISRWO , PCT/US2015/067271, dated Mar. 11, 2016, 6 pgs.
Energous Corp., IPRP , PCT/US2015/067271, dated Jul. 4, 2017, 5 pgs.
Energous Corp., ISRWO , PCT/US2014/040648, dated Oct. 10, 2014, 11 pgs.
Energous Corp., IPRP , PCT/US2014/040648, dated Dec. 8, 2015, 8 pgs.
Energous Corp., ISRWO , PCT/US2014/049673, dated Nov. 18, 2014, 10 pgs.
Energous Corp., IPRP , PCT/US2014/049673, dated Feb. 9, 2016, 6 pgs.
Energous Corp., ISRWO , PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., ISRWO, PCT/US2015/067287, dated Feb. 2, 2016, 8 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Energous Corp., ISRWO, PCT/US2016/068987, dated May 8, 2017, 10 pgs.
Energous Corp., ISRWO, PCT/US2016/069316, dated Mar. 16, 2017, 15 pgs.
Energous Corp., ISRWO, PCT/US2018/012806, dated Mar. 23, 2018, 9 pgs.
Energous Corp., ISRWO, PCT/US2017/046800, dated Sep. 11, 2017, 13 pgs.
Energous Corp., ISRWO, PCT/US2017/065886, dated Apr. 6, 2018, 13 pgs.
Order Granting Reexamination Request Control No. 90013793 Aug. 31, 2016, 23 pgs.
*Ossia Inc.* vs *Energous Corp.*, PGR2016-00023-Institution Decision, Nov. 29, 2016, 29 pgs.
*Ossia Inc.* vs *Energous Corp.*, PGR2016-00024-Institution Decision, Nov. 29, 2016, 50 pgs.
*Ossia Inc.* vs *Energous Corp.*, PGR2016-00024-Judgement-Adverse, Jan. 20, 2017, 3 pgs.
ReExam Ordered Control No. 90013793 Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
European Search Report, EP15876036, dated May 3, 2018, 9 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334, Oct. 3, 2013.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antenna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
Li et al. High-Efficiency Switching-Mode Charger System Design Considerations with Dynamic Power Path Management, Mar./Apr. 2012 Issue, 8 pgs.

(56) References Cited

OTHER PUBLICATIONS

Energous Corp., ISRWO, PCT/US2016/069313 dated Nov. 13, 2017, 10 pgs.
Energous Corp., IPRP, PCT/US2016/069313 dated Jul. 3, 2018, 7 pgs.
Energous Corp., IPRP, PCT/US2016/068993, dated Jul. 3, 2018, 10 pgs.
Energous Corp., IPRP, PCT/US2016/069316, dated Jul. 3, 2018, 12 pgs.

* cited by examiner

TRANSMITTER 200

ANTENNA BOARDS 202

TRANSMITTER BOARDS 204

RADIO FREQUENCY INTEGRATED CIRCUIT (RFIC) 206

POWER SOURCE 208

*FIG. 2*

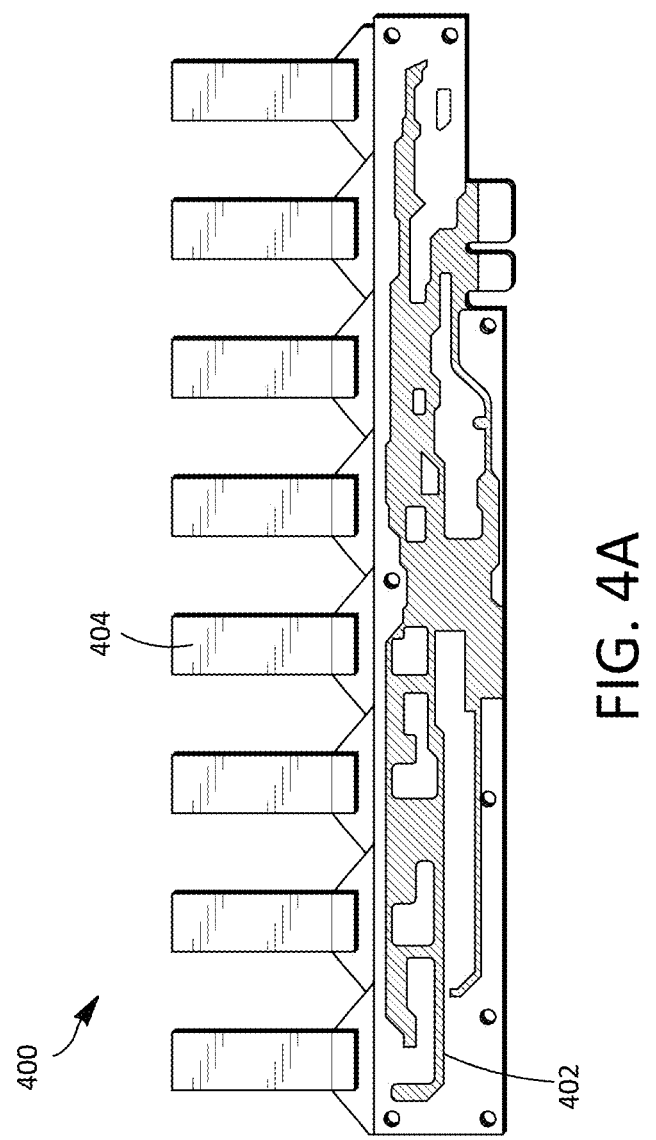

MODULAR ANTENNA BOARDS IN WIRELESS POWER TRANSMISSION SYSTEMS

CROSS-REFERENCE TO RELATED APPLICATIONS

This non-provisional application claims the benefit of U.S. Provisional Patent Application Ser. No. 62/272,427, entitled "Modular Antennas in Wireless Power Transmission Systems," filed Dec. 29, 2015, and U.S. Provisional Patent Application Ser. No. 62/273,204, entitled "Modular Antennas in Wireless Power Transmission Systems," filed Dec. 30, 2015, each of which is incorporated by reference in its entirety.

TECHNICAL FIELD

This application generally relates to wireless power transmission systems and antenna components used in such systems.

BACKGROUND

Electronic devices, such as laptop computers, smartphones, portable gaming devices, tablets, or others, require power to operate. This state of being may entail having to charge electronic equipment at least once a day, or in high-use or power-hungry electronic devices, more than once a day. Such activity may be tedious and may present a burden to some users. For example, a user may be required to carry chargers in case his electronic equipment is lacking power. In addition, some users have to find available power sources to connect to, which is time consuming. Lastly, some users must plug into a wall or some other power supply to be able to charge their electronic device. However, such activity may render electronic devices inoperable or not portable during charging.

Numerous attempts have been made to wirelessly transmit energy to electronic devices, where a receiver device can consume the transmission and convert it to electrical energy. However, most conventional techniques are unable to transmit energy at any meaningful distance. For example, magnetic resonance provides electric power to devices without requiring an electronic device to be wired to a power resonator. However, the electronic device is required to be proximately located to a coil of the power resonator (i.e., within a magnetic field). Other conventional solutions may not contemplate user mobility for users who are charging their mobile devices, or such solutions do not allow devices to be outside of a narrow window of operability.

While certain advancements in remote wireless charging have occurred, acceptance of the new technology into homes and businesses (e.g., conference rooms) often requires design elements that extend beyond functionality. As an example, for remote wireless power charging that enables a transmitter to deliver high gain in small areas while avoiding power transmission to other nearby areas, transmitter antennas may be utilized. Also with the introduction of many applications into the 2.4 GHz band for commercial and consumer use, transmitter antenna design has become a stumbling point for many customers, as at frequencies used for the remote wireless charging, the transmitter antennas have sufficiently large dimensions that consumers and businesses may resist deploying such devices into their homes and offices as a result of undesirable aesthetics and dimensions.

Therefore, there is a need in the art to addresses the above mentioned drawbacks of the conventional antenna systems being employed in the wireless power transmission systems.

SUMMARY

Wireless power transmission systems disclosed herein attempt to address the above issues and may provide a number of other benefits as well. Wireless power transmission system described herein provide transmitter antennas that can be integrated into a printed circuit board, and thereby solves the above mentioned drawbacks of the sufficiently large dimensioned antennas being employed in the conventional wireless power transmission system. The transmitters may comprise expandable transmitter boards that comprise ports configured to receive new antenna boards, thereby allowing end-users to expand the capabilities of the transmitter and transmitter board by adding additional antenna boards. The transmitter board may comprise specially-programmed integrated circuits, such as a processor and/or a timing circuit, that not only control and manage generation and transmission of power waves, but may also manage the transmitter's configurations to dynamically account for new antenna boards. Such dynamic reconfigurations of how the integrated circuits and the antennas of the transmitter function may prevent, or at least mitigate, the potential for the power waves to interact in an undesired manner, due to the expansion due to addition of the new antenna board. Otherwise, when a new antenna board is added, the behavior of the transmitter and the antennas might cause unaccounted for or unwanted interference among the power waves. As an example, a processor may be configured to automatically detect a new antenna board connected to an empty port of the transmitter board, and then automatically re-configure various operational parameters and behaviors, such as the selection parameters for activating certain antenna boards during power wave transmission. As another example, the processor may re-configure waveform generation parameters that are used to determine the waveform characteristics of the power waves during power wave generation and transmission.

In an embodiment, a transmitter in a wireless power transmission system includes a transmitter board comprising one or more ports configured to receive one or more antenna boards. The transmitter further includes an antenna board comprising one or more antenna elements configured to transmit power waves, wherein the antenna board is configured to be removably connected to a port of the one or more ports of the transmitter board. The transmitter further includes a heat sink attached to the transmitter board configured to absorb heat generated by the transmitter board. The heat sink has a substantially parabolic shape configured to reflect the power waves transmitted by the antenna board in a pre-determined direction.

In another embodiment, a method for making transmitter components includes forming a transmitter board comprising one or more ports configured to receive one or more antenna boards, wherein each antenna board is configured to removably connect to the transmitter board, and wherein the antenna board comprises one or more antenna elements configured to transmit power waves. The method further includes attaching a heat sink to the transmitter board configured to absorb heat generated by the transmitter board, wherein the heat sink has a substantially parabolic shape configured to reflect the power waves transmitted by the antenna board in a pre-determined direction.

In another embodiment, a transmitter of a wireless power transmission system includes a transmitter board comprising a plurality of ports configured to receive a plurality of antenna boards, wherein each respective port is configured to receive a respective antenna board, and wherein each respective antenna board comprises one or more antenna elements configured to transmit one or more power waves. The transmitter further includes a processor configured to determine each antenna board connected to a respective port of the transmitter board, and control transmission of the one or more power waves via each antenna board connected to the respective port of the transmitter board to form a pocket of energy within a transmission field of the transmitter.

In another embodiment, a method performed by a processor of a transmitter of a wireless power transmission system where the method includes identifying, by a processor configured to control a transmitter board having a plurality of ports configured to receive a plurality of antenna boards respectively, an antenna board connected to a respective port of the plurality of ports of the transmitter board, wherein each respective antenna board comprises one or more antenna elements configured to transmit one or more power waves. The method further includes selectively activating, by the processor, the antenna board connected to the respective port of the plurality of ports, whereby the processor instructs at least one antenna element of the antenna board to transmit the one or more powers. The method further includes controlling, by the processor, transmission of the one or more power waves via the at least one antenna element of the antenna board connected to the respective port to form a pocket of energy within a transmission field of the transmitter.

In another embodiment, an antenna board includes one or more antenna elements configured to transmit one or more power waves, wherein the antenna board is configured to detachably connect to a transmitter board, and wherein the transmitter board comprises a port configured to receive the antenna board.

In another embodiment, a transmitter in a wireless power transmission system includes an antenna board comprising one or more antenna elements configured to transmit one or more power waves; and a processor configured to detachably connect the antenna board to a transmitter board. The transmitter board comprises a port configured to receive the antenna board.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

FIG. 2 illustrates a transmitter of a wireless power transmission system, according to an exemplary embodiment.

FIG. 4A illustrates a front view of an antenna array of a wireless power transmission system, according to an exemplary embodiment.

DETAILED DESCRIPTION

Figure 1:
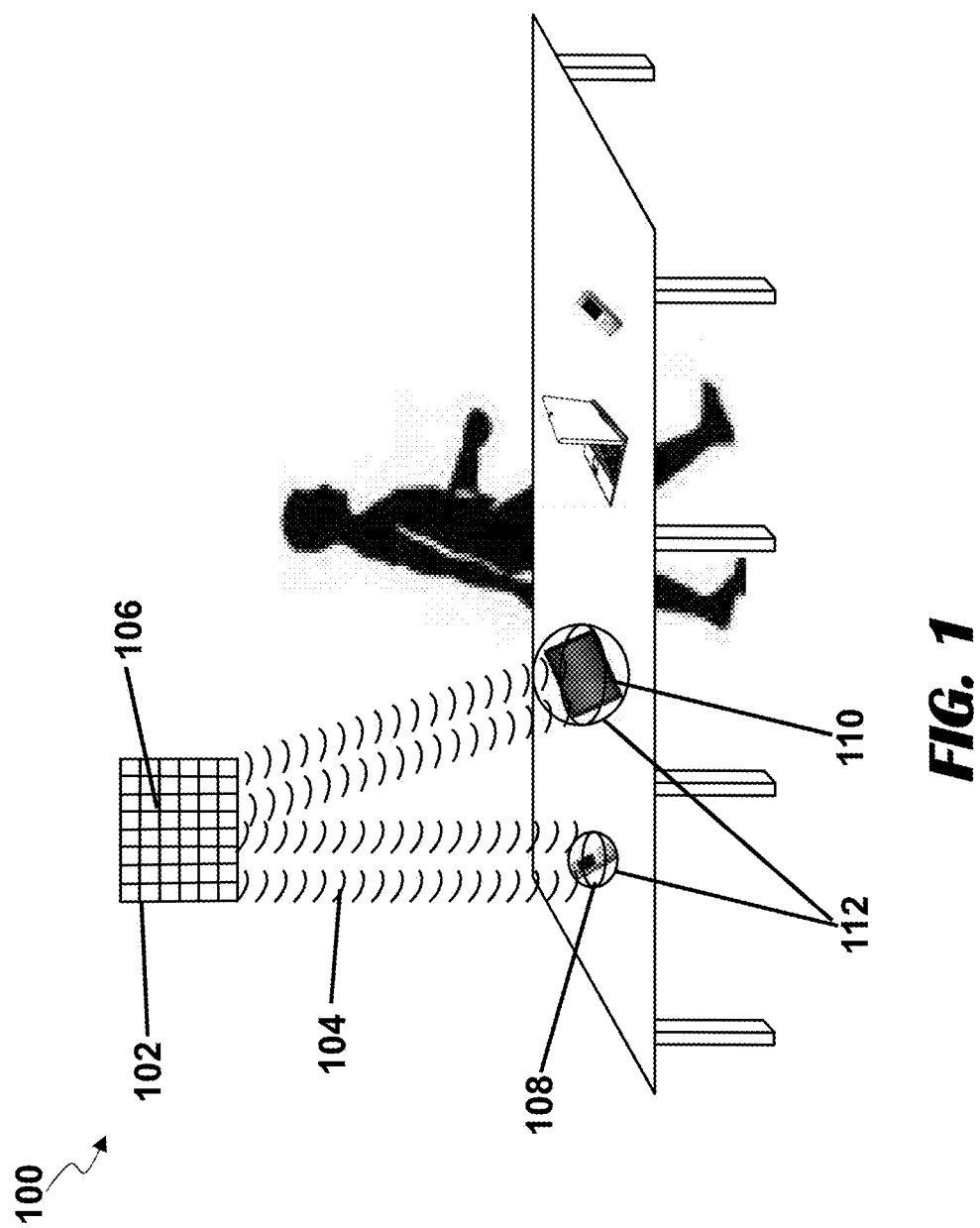
FIG. 1 illustrates a wireless power transmission system, according to an exemplary embodiment.

Reference will now be made to the exemplary embodiments illustrated in the drawings, where specific language will be used here to describe the same. It should be understood that no limitation of the scope of the invention is intended by the descriptions of such exemplary embodiments. Alterations and further modifications of the exemplary embodiments and additional applications implementing the principles of the inventive features, which would occur to a person skilled in the relevant art and having possession of this disclosure, are to be considered within the scope of this disclosure.

In a wireless power transmission system, the transmitters are devices that comprise, or are otherwise associated with, various components and circuits responsible for, e.g., generating and transmitting power waves, forming pockets of energy at locations in a transmission field, monitoring the conditions of the transmission field, and generating null spaces where needed. The transmitter may generate and transmit power waves for pocket-forming based on location of one or more receivers and/or null steering based on location of one or more objects such as humans and animals within a transmission field of the transmitter.

The transmitter comprises antenna elements that are configured to transmit power waves. The antenna elements of the transmitters may wirelessly transmit power waves having certain physical waveform characteristics, which are particular to the particular waveform technology implemented. The power waves may be transmitted to receivers within the transmission field of the transmitters in form of any physical media capable of propagating through space and being converted into useable electrical energy for charging the one or more electronic devices. The examples of the physical media may include radio frequency (RF) waves, infrared, acoustics, electromagnetic fields, and ultrasound. The power transmission signals may include any radio signal, having any frequency or wavelength. It should be appreciated by those skilled in the art that the wireless charging techniques are not limited to RF wave transmission techniques, but may include alternative or additional techniques for transmitting energy to the receivers.

Exemplary Components of Wireless Charging System

FIG. 1 illustrates a wireless power transmission system 100, according to an exemplary embodiment. The wireless power transmission system 100 includes a transmitter 102. The transmitter 102 may refer to a device, including a chip that may generate one or more power waves 104, whereby at least one RF wave is phase shifted and gain adjusted with respect to at least one other RF wave. The transmitter 102 transmits the one or more power waves 104 from an antenna array 106 to receivers connected to or integrated within one or more electronic devices, such as a mobile phone 108 and a laptop 110. The receiver may refer to a device that may include at least one antenna, at least one rectifying circuit, and at least one power converter, which may utilize a pocket of energy for powering or charging an electronic device. Non-limiting examples of an electronic device of the one or more electronic devices may include: laptops, mobile phones, smartphones, tablets, music players, toys, batteries, flashlights, lamps, electronic watches, cameras, gaming consoles, power tools, battery chargers, appliances, and GPS devices among other types of electrical devices.

The examples of the power waves 104 may include microwaves, radio frequency (RF) waves, and ultrasound waves. The power waves 104 may be controlled through phase and/or relative amplitude adjustments to form constructive and destructive interference patterns by a transmitter processor of the transmitter 102 to form a pocket of energy 112 in locations where the pocket of energy 112 is intended. The pocket of energy 112 or energy pocket may refer to an area or region of space where energy or power may accumulate based on a convergence of the power waves 104 causing constructive interference at that area or region. The pocket of energy 112 may be formed at locations of constructive interference patterns of the power waves 104 transmitted by the transmitter 102. The pockets of energy 112 may manifest as a three-dimensional field where energy may be harvested by the receivers located within or proximate to the pocket of energy 112. The pocket of energy 112 produced by the transmitter 102 during pocket forming processes may be harvested by the receiver, converted to an electrical charge, and then provided to the electronic device (e.g., laptop computer, smartphone, rechargeable battery) associated with the receiver. In the illustrative embodiment, the pocket of energy 112 is intended in the locations of the one or more electronic devices such as the mobile phone 108 and the laptop 110. The transmitter 102 is further configured to transmit the power waves 104 that may converge in three-dimensional space to create the one or more null spaces in the one or more locations where the transmitted power waves 104 cancel each other out substantially.

The transmitter 102 is placed in a housing that comprises plastic, but can comprise at least one other material, whether additionally or alternatively, such as wood, metal, rubber, glass, or others. The housing may have a shape of a cube, but other shapes are possible, such as a cuboid, a sphere, a hemisphere, a dome, a cone, a pyramid, or any other polygonal shape, whether having an open-shape or a closed-shape. Such capability may allow the location of transmitters in a variety of strategic positions, such as ceiling, decorations, walls, and the like.

A receiver may communicate with the transmitter 102 in order to indicate its position with respect to the transmitter 102. The receiver may be an integral or external component of the one or more electronic devices such as the mobile phone 108 and the laptop 110. A communications component may enable the receiver to communicate with the transmitter 102 by transmitting communication signals over a wireless protocol. The communications component may be part of the receiver or alternatively may be part of the electronic devices such as the mobile phone 108 and the laptop 110 to which the receiver interfaces. The wireless protocol can be selected from a group consisting of Bluetooth®, ZigBee, Wi-Fi, NFC, or the like. The communications component may then be used to transfer information, such as an identifier for the one or more electronic devices 108, 110, as well as battery level information of the one or more electronic devices 108, 110, geographic location data of the one or more electronic devices 108, 110, or other information that may be of use for the transmitter 102 in determining when to send energy to the receiver, as well as the location to deliver the power waves 104. The receiver may then utilize the power waves 104 emitted by the transmitter 102 to establish the pocket of energy 112, for charging or powering the one or more electronic devices 108, 110. The receiver may comprise circuitry for converting the power waves 104 into electrical energy that may be provided to the one or more electronic devices 108, 110.

The transmitter 102 may transmit or broadcast the power waves 104 to the receiver associated with the electronic devices such as the mobile phone 108 and the laptop 110. The transmitter 102 includes the antenna array 106 having the one or more antennas elements for sending the power waves 104. Each antenna of the one or more antenna elements sends power waves 104 where the transmitter 102 applies a different phase and amplitude to the power waves 104 transmitted from different antennas of the one or more elements. The transmitter 102 can form a phased array of delayed versions of the power waves 104 to be transmitted, then applies different amplitudes to the delayed versions of the power waves 104, and then sends the power waves 104 from appropriate antennas of the one or more elements.

In some embodiments, the one or more electronic devices 108, 110 may be distinct from the receiver associated with the one or more electronic devices 108, 110. In such embodiments, the one or more electronic devices 108, 110 may be connected to the receiver over a wire that conveys converted electrical energy from the receiver to the one or more electronic devices 108, 110.

Exemplary Transmitter Device

FIG. 2 illustrates a transmitter 200 of a wireless power transmission system, according to an exemplary embodiment. FIG. 2 will be explained in conjunction to FIG. 1. The transmitter 200 may transmit or broadcast power waves to a receiver associated with an electronic device. Although several of the embodiments mentioned below describe the power waves as radio frequency (RF) waves, it should be appreciated that the power waves may be physical media that is capable of being propagated through space, and that is capable of being converted into a source of electrical energy. The transmitter 200 includes antenna elements that may transmit the power waves as a single beam directed at the receivers. In some cases, the antenna elements of the transmitter 200 may transmit a plurality of power waves that are propagated in a multiple directions and may deflect off of physical obstructions (e.g., walls). The transmitter 200 may control pocket-forming based on phase and/or relative amplitude adjustments of power transmission signals, to form constructive interference patterns.

The transmitter 200 may comprise an application-specific integrated circuit (ASIC). The ASIC may be part of the circuitry on the antenna boards 202, one or more transmitter boards 204. In addition to the ASIC, there may be one or more radio frequency integrated circuits (RFIC) 206, a power source 208, among other components in the transmitter 200. In an embodiment, a transmitter board 204 may be a printed circuit board (PCB). The transmitter 200 may be encased in a housing, which may allocate all the requested components for the transmitter 200. The components in the transmitter 200 may be manufactured using metamaterials, micro-printing of circuits, nano-materials, and/or any other materials, it may include integrated circuits and it may also include discrete components. It should be obvious to someone skilled in the art that the entire transmitter 200 or the entire receiver can be implemented on a single circuit board, as well as having one or more of the functional blocks implemented in separate circuit boards.

Antenna elements may be connected to the antenna boards 202. In an embodiment, the antenna boards 202 may be connected to the transmitter board 204. In another embodiment, the antenna elements may be formed directly on the transmitter board 204. The antenna elements may be defined in areas of the transmitter board 204. By forming the antenna elements in the transmitter board 204, the cost of the antenna elements may be reduced. The antenna elements may be formed on the transmitter board 204 with the same process used to form the transmitter board 204.

The antenna boards 202 includes one or more antenna elements that may include any type of antenna elements capable of transmitting and/or receiving signals in frequency bands used by the transmitter 200. The one or more antenna elements may include vertical or horizontal polarization, right hand or left hand polarization, elliptical polarization, or other polarizations, as well as any number of polarization combinations. Using multiple polarizations can be beneficial in devices where there may not be a preferred orientation during usage or whose orientation may vary continuously through time, for example a smartphone or portable gaming system. For devices having a well-defined expected orientation, for example video controller, there might be a preferred polarization for antennas, which may dictate a ratio for the number of antennas of a given polarization. The types of antenna elements, may include patch antennas, which may have heights from about ⅛ inch to about 6 inches and widths from about ⅛ inch to about 6 inches. The patch antennas may preferably have polarization that depends upon connectivity, i.e., the polarization may vary depending on from which side the patch is fed.

An antenna element may be directional and/or omni-directional and also include flat antenna elements dipole antenna elements, and any other suitable antenna for wireless power transmission. Suitable antenna element types may include, for example, patch antennas with heights from about ⅛ inch to about 6 inches and widths from about ⅛ inch to about 6 inches. The shape and orientation of antenna element 202 may vary depending on the desired features of the transmitter 200. For example, orientation may be flat in X, Y, and Z axes, as well as various orientation types and combinations in three dimensional arrangements may be provided. The antenna element materials may include any suitable material that may allow RF signal transmission with high efficiency, good heat dissipation, or the like. The amount of antenna elements may vary in relation with the desired range and power transmission capability on the transmitter 200; the more antenna elements, the wider range and higher the power transmission capability.

The antenna element may include suitable antenna types for operating in frequency bands such as 900 MHz, 2.5 GHz or 5.8 GHz as these frequency bands conform to Federal Communications Commission (FCC) regulations part 18 (industrial, scientific, and medical equipment). The antenna element may operate in multiple frequencies, allowing a multichannel operation of pocket-forming The antenna element may also have at least one polarization or a selection of polarizations. Such polarization may include vertical polarization, horizontal polarization, circularly polarized, left hand polarized, right hand polarized, or a combination of polarizations. The selection of polarizations may vary in depending on the transmitter 200 characteristics. In addition, the antenna element may be located in various surfaces of the transmitter 200. The antenna element may operate in single array, pair array, quad array and any other suitable arrangement that may be designed in accordance with the desired application.

The transmitter 200 may include transmitter board 204 layers, which may include antenna element and/or RFIC for easy implementation and cost reduction. The transmitter board 204 may mechanically support and electrically connect the electronic components described herein using conductive tracks, pads and/or other features etched from copper sheets laminated onto a non-conductive substrate. Transmitter board 204 may be single sided (one copper layer), double sided (two copper layers), and/or multi-layer. Multiple transmitter boards 204 layers may reduce size of the transmitter and make it easier to integrate it into commercial applications. Transmitter board 204 layers may be connected to a single transmitter processor, an ASIC, and/or to general purpose microcontrollers.

In some implementations, a box transmitter, including a plurality of transmitter board 204 layers inside it may include a detachable antenna board 202 for providing greater control over pocket-forming and allow a flexible implementation. Furthermore, range of wireless power transmission may be increased by the box transmitter. Multiple transmitter boards 204 layers may increase the range and the amount of power waves (e.g., RF power waves, ultrasound waves) that could be transferred and/or broadcasted wirelessly by the transmitter 200 due the higher density of the antenna element. The transmitter board 204 layers may be connected to the single transmitter processor and/or to dedicated microcontroller for each antenna board 202. Furthermore, box shape of the transmitter 200 may increase action ratio of wireless power transmission. In some implementations, the entire side of the transmitter board 204 may be closely packed with the antenna boards 202. The RFIC may connect to multiple antenna elements. The multiple antenna elements 202 may surround a single RFIC.

The transmitter 200 may include the RFIC 206 that may receive an RF signal from the processor 202, and split the RF signal into multiple outputs, each output linked to the antenna element 202. For example, each RFIC 206 may be connected to four antenna elements 202. In some implementations, each RFIC 206 may be connected to eight, sixteen, and/or multiple antenna elements 202. The RFIC 206 may include a plurality of RF circuits that may include digital and/or analog components, such as, amplifiers, capacitors, oscillators, piezoelectric crystals and the like. The RFIC 206 may control features of the antenna element 202, such as gain and/or phase for pocket-forming and manage it through direction, power level, and the like. The phase and the amplitude of pocket-forming in each antenna element 202 may be regulated by the corresponding RFIC 206 in order to generate the desired pocket-forming and/or creating signal null in specific locations. In addition, the RFIC 206 may be connected to the microcontroller, which may utilize digital signal processing (DSP), ARM, central processor, computer, and the like. The lower number of the RFICs 206 present in the transmitter 200 may correspond to desired features such as lower control of multiple pocket-forming, lower levels of granularity, and a less expensive embodiment. In some implementations, the RFIC 206 may be connected to one or more processors, and the processor may be included into an independent base station or into the transmitter 200.

In some implementations of the transmitter 200, the phase and the amplitude of each pocket-forming in each antenna element may be regulated by the corresponding RFIC 206 in order to generate the desired pocket-forming and creating transmission nulls in specific locations. The RFIC 206 signals connected to each antenna board 202 may reduce processing requirement and may increase control over pocket-forming, allowing multiple pocket-forming and a more granular pocket-forming with less load over the microcontroller, and a higher number of multiple pocket-forming may be allowed. Furthermore, multiple pocket-forming may charge a higher number of receivers and may allow a better trajectory to such receivers.

The RFIC 206 and the antenna board 202 may operate in any suitable arrangement that may be designed in accordance with the desired application. For example, the transmitter 200 may include the antenna board 202 and the RFIC 206 in a flat arrangement. A subset of 4, 8, 16, and/or any number of antenna elements may be connected to a single RFIC 206. The RFIC 206 may be directly embedded behind each antenna board 202; such integration may reduce losses due the shorter distance between components. In some implementations, a row or column of antenna board 202 may be connected to a single processor. The RFIC 206 connected to each row or column may allow a less expensive transmitter 200 that may produce pocket-forming by changing phase and gain between rows or columns.

In some implementations, a cascade arrangement of the RFICs 206 may be implemented. A flat transmitter 200 using a cascade arrangement of the RFICs 206 may provide greater control over pocket-forming and may enable more accurate targeting of receivers, as well as a higher reliability and accuracy may be achieved because multiple redundancy of RFICs 206.

The transmitter 200 may be fed by the power source 208 that may include AC or DC power supply. Voltage, power, and current intensity provided by power source 208 may vary in dependency with the required power to be transmitted. Conversion of power to radio signal may be managed by the microcontroller and carried out by RFIC 206 that may utilize a plurality of methods and components to produce radio signals in a wide variety of frequencies, wavelength, intensities, and other features. As an exemplary use of a variety of methods and components for radio signal generation, oscillators and piezoelectric crystals may be used to create and change radio frequencies in different antenna elements. In addition, a variety of filters may be used for smoothing signals as well as amplifiers for increasing power to be transmitted.

The transmitter 200 may emit the RF power waves that are pocket-forming with a power capability from a few watts to a predetermined number of watts required by a particular chargeable electronic device. Each antenna board 202 may manage a certain power capacity.

Exemplary Heat Sink Device

Figure 3A:
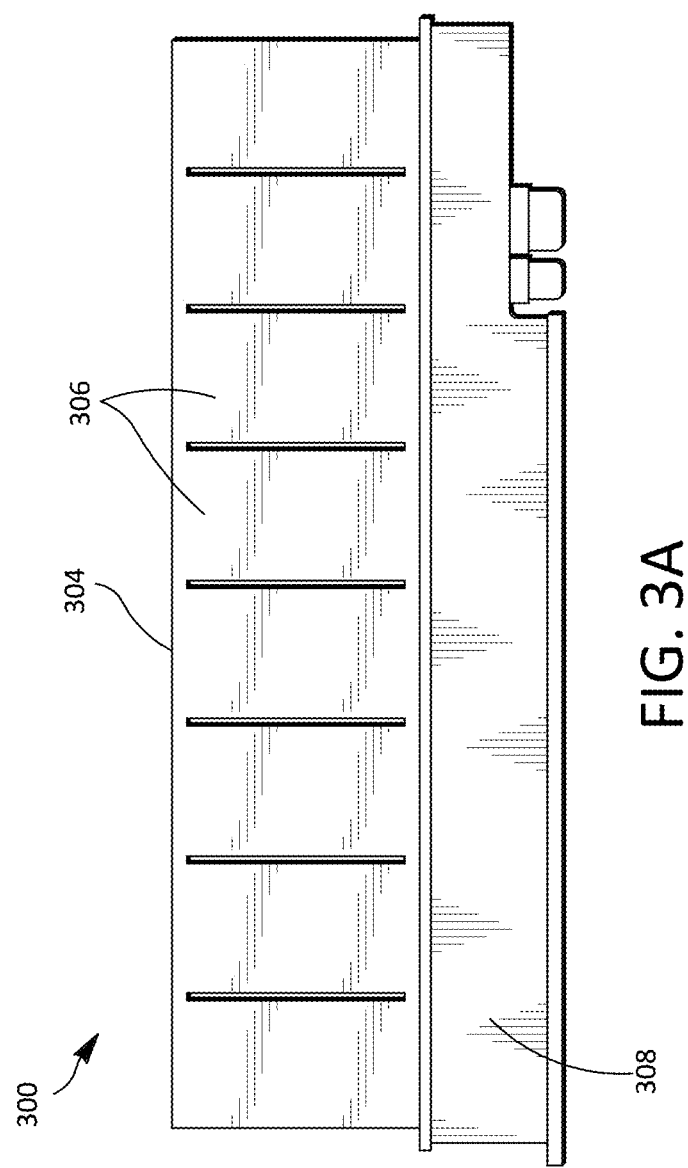
FIG. 3A illustrates a front view of an antenna array of a wireless power transmission system, according to an exemplary embodiment.
Figure 3B:
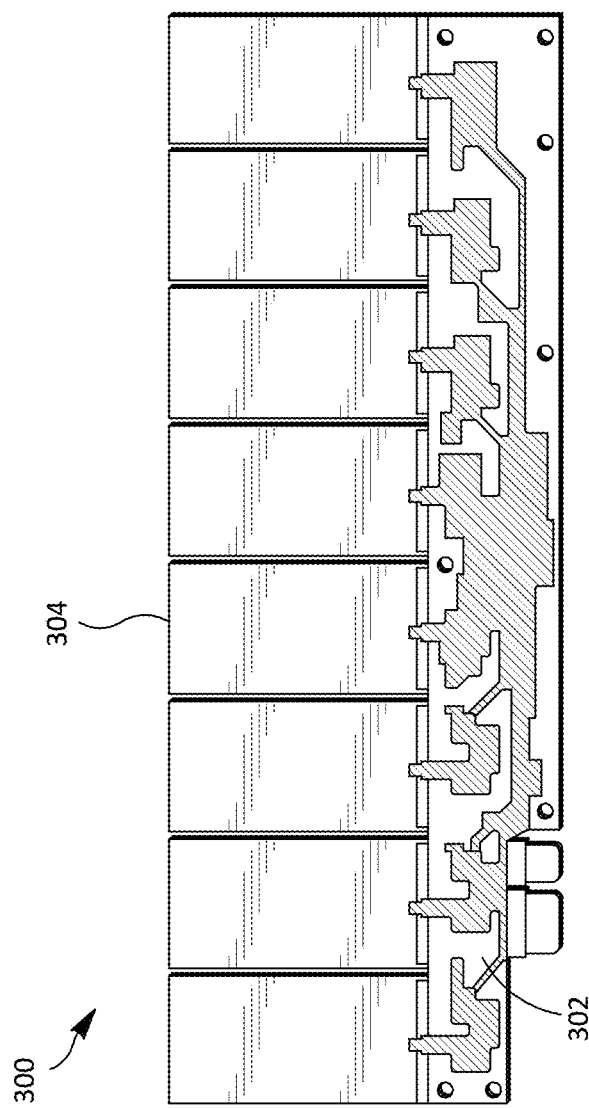
FIG. 3B illustrates a rear view of an antenna array of a wireless power transmission system, according to an exemplary embodiment.

FIG. 3A and FIG. 3B illustrates a schematic diagram of a front view and a rear view of an antenna array 300 of a wireless power transmission system, according to an exemplary embodiment. FIG. 3A and FIG. 3B will be explained in conjunction to FIG. 1 and FIG. 2. The transmitter may include a transmitter board 302. The transmitter board 302 may have a structure in which a plurality of conductive plates are electrically separated and structurally supported by a dielectric layer also stacked with the conductive plates. The transmitter board 302 allows electrical connection between electronic products to be implemented with high density, low costs, high reliability, and high productivity. A plurality of grounding layers and a plurality of ground vias that connect the plurality of grounding layers may be formed in the transmitter board 302.

A power feeding line may be formed on the transmitter board 302. An antenna board 304 may be removably connected to the transmitter board 302 and electrically coupled to the power feeding line. In another embodiment, the transmitter board 302 may have a structure in which the antenna board 304 for wireless communication is integrally formed in the PCB 302. The structure allows omission of an assembly process of a ball grid array (BGA) or a land grid array (LGA) which is used to bond the antenna board 304, which is separately manufactured from the transmitter board 302, and a physical distance between the antenna board 304 and the transmitter board 302 is minimized. The transmitter may further include a radio frequency integrated circuit (RFIC) attached to the transmitter board 302. The RFIC, the transmitter board 302, and the antenna board 304 (comprising one or more antenna elements 306) may be formed as a single or separate components.

The RFIC may also be bonded to the transmitter board 302. The RFIC chip may be bonded to the transmitter board 302 using, for example, by flip-chip bonding. However it will be apparent to a person having ordinary skill in the art that the bonding method is not limited thereto, and the RFIC chip may be bonded to the transmitter board 302 by using wire bonding or other any other suitable surface mounting methods, e.g. BGA or LGA. In another embodiment, the antenna board 304 may be bonded to the RFIC in a final process using a surface mounting method such as a flip-chip bonding method or a wire bonding method, and then the combined antenna board 304 and RFIC may be bonded to the transmitter board 302 using surface mount technology (SMT) such as a ball grid array (BGA), a land grid array (LGA), etc.

The RFIC, the transmitter board 302, and the antenna board 304 (comprising one or more antenna elements 306) may also be individually designed and separately manufactured in an alternate embodiment in order to provide respective performances thereof in the high frequency bands. The transmitter may then be assembled from the separately manufactured antenna board 304, the RFIC, and the transmitter board 302.

In one embodiment, the antenna board 304 connected to the transmitter board 302 may behave like metamaterial antennas. Metamaterials are artificial composites that achieve material performance beyond the limitation of uniform materials and exhibit properties not found in naturally-formed substances. Such artificially structured materials are typically constructed by patterning or arranging a material or materials to expand the range of electromagnetic properties of the material. When an electromagnetic wave enters a material, the electric and magnetic fields of the wave interact with electrons and other charges of the atoms and molecules of the material. These interactions alter the motion of the wave changing the electromagnetic wave propagation properties in the material, e.g., velocity, wavelength, direction, impedance, index of refraction, and the like. Similarly, in a metamaterial, the electromagnetic wave interacts with appropriately designed artificial unit cells that macroscopically affect these characteristics. In an embodiment, the metamaterial may comprise an array of unit cells formed on or in a dielectric substrate and are configured to radiate wireless power signals to power electronic devices.

In one example, a metamaterial structure may be a periodic structure with a metamaterial unit cell. The metamaterial unit cell may include a surface having a metal patch with an aperture. The aperture is defined such that a periphery of the aperture is within a periphery of the surface by a spacing distance. An antenna element may be disposed within the aperture.

In another embodiment, the antenna board 304 connected to the transmitter board 302 includes, for example, a patch antenna. The patch antenna radiates a wireless signal and is configured to have a pattern suitable for a signal frequency. For example, the patch antenna may be configured to radiate a millimeter waveband signal. The patch antenna may be configured to include at least two layers of planar patterns, and is not limited to the illustrated two-layer structure. Also, the patch antenna may have an array structure including a plurality of antennas.

In one example, the patch antenna may include a high dielectric constant substrate having a cavity, a radiator disposed on a portion of one surface of the high dielectric constant substrate corresponding to the cavity, a feeder line disposed on the high dielectric constant substrate and supplying a signal to the radiator, and a ground part disposed on the high dielectric constant substrate. In another example, the patch antenna may include a dielectric body, radiation element, earth conductor and feed member. The radiation element may be disposed on a surface of the dielectric body, and each side of the radiation element has a length adjusted based on the frequency of a radio wave to be received and the effective permittivity of the dielectric body. The earth conductor may be disposed on the bottom surface of the dielectric body. The feed member may be electrically connected to the radiation element.

In another embodiment, the antenna board 304 connected to the transmitter board 302 includes, for example, a helical antenna, in which a resonator element is embedded within a substrate. The resonator element may be configured in a helical shape with four or more turns. The dimensions and number of turns is dependent on a frequency range at which the antenna is to operate as well as its desired directivity. The helical antenna operates at frequencies over 1 GHz, however, the helical antenna may be configured to operate at frequencies in a range from 900 MHz to 100 GHz. The dimensions of the helical antenna and type of helical antenna may be configured to accommodate the frequencies of operation. The substrate may be cylindrical, and configured to embed the resonator element therein. The substrate may also be ceramic, where the ceramic may be alumina. The substrate further operates as a dielectric, and is denser than air. The substrate may be any material that provides for a relative permittivity between approximately 9 and 10 at a center frequency of a wireless signal transmitted by the transmitter via the helical antenna. A base may include a circular portion that defines a support region in which the substrate may be positioned. The base may also include a connector through which a conductor extends to a feed point to feed power signals to the resonator element that is to be transmitted by the helical antenna to an electronic device, for example, to be charged.

In another embodiment, the antenna board 304 connected to the transmitter board 302 and inside the transmitter board 302 and includes, for example, a stamped antenna resonator element configured to transmit a wireless power signal. The resonator element may be metallic, and configured to provide a certain inductive-capacitive (LC) response profile for transmitting a wireless power signal for use in remotely powering an electronic device and/or recharging a battery. The resonator element when configured into an antenna operates at frequencies in a range from over 1 GHz to 100 GHz. The dimensions of the resonator element may be configured to accommodate the frequencies of operation. In one example, the stamped resonator element may be a stamped piece of metal. The resonator element may include a plurality of horizontal resonator elements interconnected by vertical sections. The vertical sections may not be perpendicular to the horizontal resonator elements, but may provide for a transition that separates the horizontal resonator elements by a certain gap that provides for a predetermined inductive-capacitive response profile over a certain frequency range of operation. Each of the horizontal resonator elements may be at least in part planar, vertically aligned, and in parallel with one another. In being vertically aligned, at least a portion of each of the resonator elements may be disposed over one another. A signal feed may be positioned along one side of the stamped resonator element to conduct RF signals thereto. The signal feed may be formed by a stamping operation of a single piece of metal that forms the stamped resonator element or may be formed by another piece of metal and connected to the resonator element. Alternatively, an induction technique may be utilized to apply the RF signal to the resonator element for transmission of the wireless power signal.

In an embodiment, a heat sink 308 may be formed at a surface of the transmitter board 302 on which the antenna board 304 including one or more antenna elements 306 is connected. The heat sink 308 may be formed of a metal having good thermal conductivity, and may include a plurality of heat dissipation pins to increase heat radiation efficiency. In some embodiments, the heat sink 308 may include cooling elements that may include cooling fins. In other embodiments, the heat sink 308 may further comprise a heat pipe and an external liquid cooler or air cooler.

The transmitter board 302 includes a plurality of surfaces where the antenna board 304 and the heat sink 308 are formed on opposite sides of same surface of the plurality of surfaces. The heat sink 308 is formed on the transmitter board 302 such that the placement of the heat sink 308 with respect to the antenna board 304 and shape of the heat sink 308 allows the heat sink 308 to operate as a reflector to direct the power waves emitted from the one or more antenna elements 306 of the antenna board 304 in a pre-determined direction. The shape of the heat sink 308 is typically designed to facilitate high radiation gain of the one or more antenna elements 306. In one example, the shape of the heat sink 308 is parabolic. In another example, the shape of the heat sink 308 is U-shaped. The gain refers to a mathematical measure of an antenna radiation pattern compared to a reference antenna such as a dipole or an isotropic radiator. The gain may be measured in dBs relative to a dipole or dBi relative to an ideal isotropic. In any given direction, a negative gain means that the antenna radiates less than the reference antenna and a positive number means that the antenna radiates more than the reference antenna. The decibel (dB) refers to a logarithmic scale that represents power gain or loss in an RF circuit. For example, 3 dB represents a doubling of power, −3 dB is half the power and −6 dB represents half the voltage or current, but a quarter of the power.

In one example, the shape of the heat sink 308 may be designed based on the number of one or more antenna elements 306 to allow the heat sink 308 to operate as a reflector to direct the power waves emitting from the one or more antenna elements 306 in a pre-determined direction. In another example, the shape of the heat sink 308 may be designed based on the shape of the one or more antenna elements 306 to allow the heat sink 308 to operate as a reflector to direct the power waves emitting from the one or more antenna elements 306 in a pre-determined direction. In yet another example, the shape of the heat sink 308 may be designed based on the number and shape of one or more antenna elements 306 to allow the heat sink 308 to operate as a reflector to direct the power waves emitting from the one or more antenna elements 306 in a pre-determined direction. In yet another example, the shape of the heat sink 308 may be designed based on the type of one or more antenna elements 306 to allow the heat sink 308 to operate as a reflector to direct the power waves emitting from the one or more antenna elements 306 in a pre-determined direction.

In the preferred embodiment, the one or more antenna elements 306 are configured to operate in a frequency band of 5.8 GHz. The height of at least one antenna element of the one or more antenna elements 306 may be from about ⅛ inches to about 1 inch, where the width of the at least one antenna element may be from about ⅛ inches to about 1 inch. The distance between two adjacent antenna elements of the one or more antenna elements 306 may be a fraction of Lambda and up to about 1 Lambda (e.g. ½ Lambda, ¼ Lambda, 1/12 Lambda). The one or more antenna elements 306 may also be positioned at a pre-defined distance with respect to each other such that power waves transmitted by the one or more antenna elements 306 are directed to form a pocket of energy at a receiver within an electronic device. The one or more antenna elements 306 may be configured to transmit power waves at a different time from each other based on placement of the one or more antenna elements 306. The one or more antenna elements 306 may also be positioned at a pre-defined depth with respect to each other such that power waves transmitted by the one or more antenna elements 306 are focused on a receiver and do not form a pocket of energy outside a receiver within an electronic device. The one or more antenna elements 306 may also have a mutual coupling among them where the mutual coupling is inductive or capacitive coupling between the one or more antenna elements 306.

The transmitter board 302 may also be connected to one or more processors for each antenna element of the one or more antenna elements 306 formed on the transmitter board 302. The processor may control, manage, and otherwise govern the various processes, functions, and components of the transmitter. The processors may be configured to operate one or more antenna switches that may be connected to the one or more antenna elements 306, and one or more filters are also connected to the one or more antenna switches. The processors are further configured to activate a first set of antenna elements of the one or more antenna elements 306 based on a target for directing a pocket of energy using power waves where the first set of antenna elements may be selected based on a distance between antenna elements of the first set of antenna elements.

The processor may include suitable logic, circuitry, and interfaces that are operable to execute one or more instructions to perform predetermined operations of the transmitter. The processor may be realized through a number of processor technologies known in the art. The examples of the processor, i.e. microcontroller, include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor, among others.

Figure 4B:
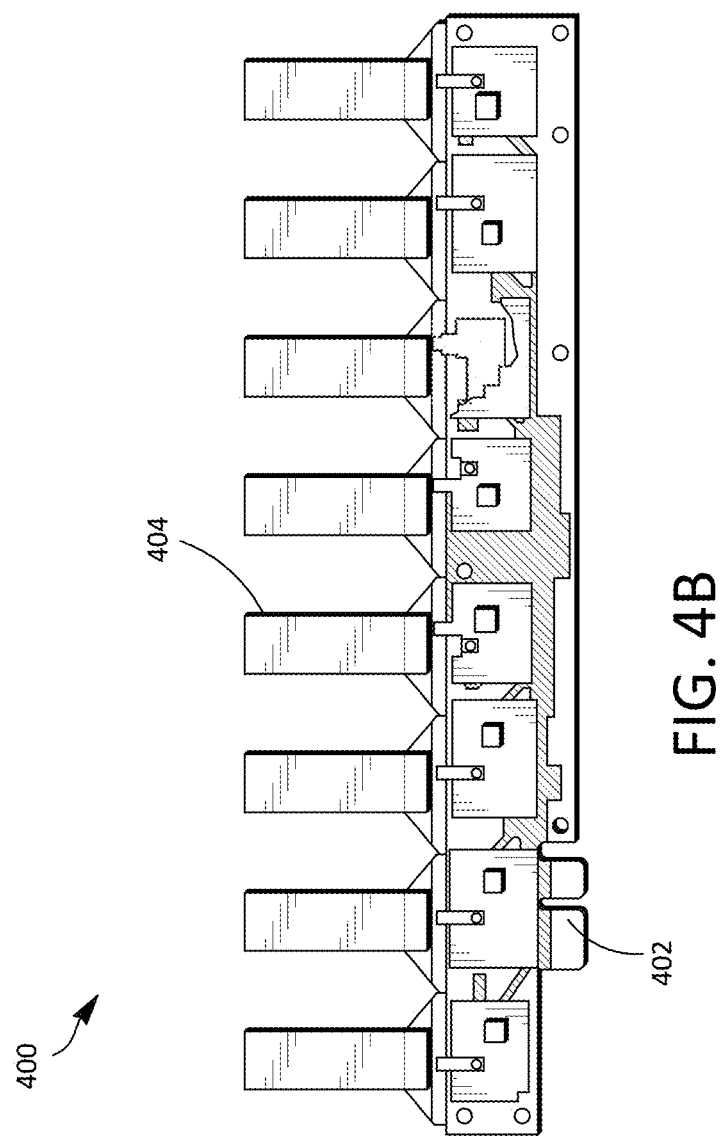
FIG. 4B illustrates a rear view of an antenna array of a wireless power transmission system, according to an exemplary embodiment.

FIG. 4A and FIG. 4B illustrates a schematic diagram of a front view and a rear view of an antenna array 400 of a wireless power transmission system, according to an exemplary embodiment. The connection between transmitter board 402, antenna board 404, and heat sink in the FIG. 4A and FIG. 4B is same as described in FIG. 3A and FIG. 3B. For example, the PCB 402 include a plurality of surfaces where the antenna board 404 and a heat sink are placed on opposite sides of same surface of the plurality of surfaces. The heat sink is formed on the transmitter board 402 such that the placement of the heat sink with respect to the antenna board 404 and a shape of the heat sink is designed, such that the heat sink operates as a reflector to direct energy in a pre-determined direction. The shape of the heat sink is typically configured to facilitate high radiation gain of antenna elements of the antenna board 404. In one example, the shape of the heat sink is parabolic. In another example, the shape of the heat sink is U-shaped. The heat sink may be formed of a metal having good thermal conductivity, and may include a plurality of heat dissipation pins to increase heat radiation efficiency.

The antenna elements of the antenna board 404 described herein are ceramic antenna elements. In an embodiment, the ceramic antenna element may be a small antenna component made of ceramic material. There may be several types of ceramic antennas each with its own characteristics.

The ceramic antenna element may include a substrate and a conductor. The body of the substrate may have two free ends that form two conductive terminals. In another embodiment, the ceramic antenna element comprises a metal antenna further comprising an inverted F-type antenna, a planar inverted-F antenna or a monopole antenna. The process used is usually printing on the ceramic block complex radiation pattern, or using low temperature co-fired ceramic process to print multilayer metal pattern. In yet another embodiment, the antenna element may be a compact ceramic based antenna without printing a small amount of the metal pattern. The structure of such an antenna element is simple, has high radiation efficiency, and it is easy to adjust the resonant frequency.

In another embodiment, the ceramic antenna may include a substrate and a conductor. The substrate may be made of ceramic material with a low dielectric loss and a high dielectric constant. The conductor may be made of metal with a high Q factor as well as a good anti-oxidization property, and being formed on surfaces of the substrate by means of mask etching or printing technology. The conductor may have a circuit portion disposed on surfaces of the substrate in a helical manner, and two conducting electrodes may be disposed at two concavities of the substrate and connected by the circuit portion.

The ceramic antennas offer advantages such as they are separate components, have small sizes and a variety of configurations are available. Also, close proximity of the ceramic antenna to other components doesn't cause severe detuning. The ceramic antennas are also less affected by environmental factors. Further, flexible tuning and testing options are possible, and the design changes are more easily introduced.

Figure 5:
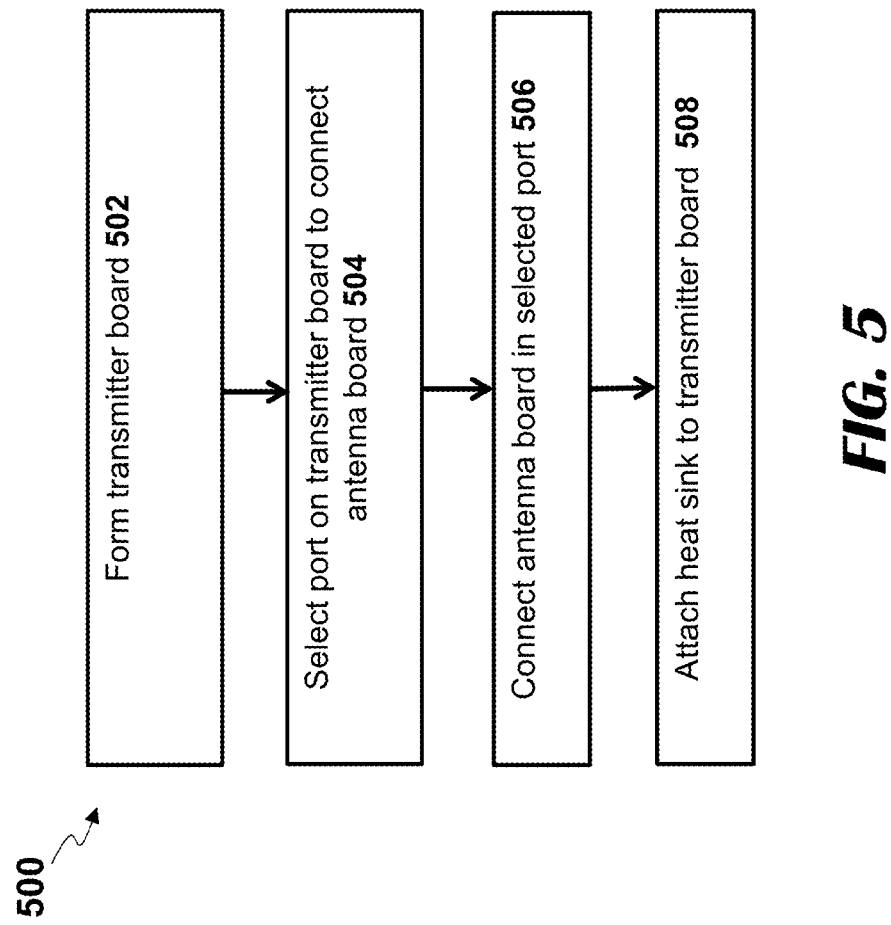
FIG. 5 is a flow diagram depicting forming a heat sink in a wireless power transmission system, according to an exemplary embodiment.

FIG. 5 is a flow diagram 500 depicting forming a heat sink in a wireless power transmission system, according to an exemplary embodiment.

At step 502, form transmitter board. The transmitter board may be formed to build a variety of devices and circuitry for the wireless power transmission system. The transmitter board may have a structure in which a plurality of conductive plates are electrically separated and structurally supported by a dielectric layer also stacked with the conductive plates. The transmitter board allows electrical connection between electronic products to be implemented with high density, low costs, high reliability, and high productivity. A plurality of grounding layers and a plurality of ground vias that connect the plurality of grounding layers may be formed in the transmitter board. In an embodiment, the transmitter board comprises a power feeding line and one or more ports.

At step 504, select port on the transmitter board to removably connect at least one antenna board. The antenna board comprises one or more antenna elements configured to transmit power waves.

At step 506, connect the at least one antenna board in selected port. The antenna board including one or more antenna elements is connected in the selected port. The connection between the antenna board and the port on the transmitter board is removable. The at least one antenna board is also electrically coupled to the power feeding line of the transmitter board.

At step 508, the heat sink is attached to the transmitter board. The transmitter board may include a plurality of surfaces where the antenna board and the heat sink may be located on opposite sides of same surface of the plurality of surfaces. The heat sink is attached to the transmitter board such that the placement of the heat sink with respect to the at least one antenna board, and shape of the heat allows the heat sink to operate as a reflector to direct the wireless power waves transmitted from the at least one antenna board in a pre-determined direction. In one example, the shape of the heat sink is parabolic. In another example, the shape of the heat sink is U-shaped heat sink.

During operation, a receiver may communicate with a transmitter having the transmitter board in order to indicate its position with respect to the transmitter. The receiver may be an integral or external component of the one or more electronic devices such as the mobile phone and the laptop. A communications component may enable the receiver to communicate with the transmitter by transmitting communication signals over a wireless protocol. The communications component may then be used to transfer information, such as an identifier for the one or more electronic devices as well as battery level information of the one or more electronic devices, geographic location data of the one or more electronic devices, or other information that may be of use for the transmitter in determining when to send energy to the receiver, as well as the location to deliver the power waves.

The transmitter may transmit or broadcast the power waves to the receiver associated with the electronic device, such as a mobile phone or laptop. The transmitter includes the antenna board formed on the transmitter board having one or more antennas elements for sending the power waves. Each antenna of the one or more antenna elements sends power waves where the transmitter applies a different phase and amplitude to the power waves transmitted from different antennas of the one or more elements.

During the transmission of power waves from the antenna elements, the heat sink operates as a reflector to direct the power waves emitted from the antenna elements of the antenna board in a pre-determined direction. The shape of the heat sink, which may be parabolic or U-shaped, facilitates high radiation gain of the antenna elements due to the ability of the heat sink to direct the power waves emitted from the antenna elements of the antenna board in a pre-determined direction.

The receiver may then utilize the power waves emitted by the transmitter to establish a pocket of energy, for charging or powering the one or more electronic devices. The receiver may comprise circuitry for converting the power waves into electrical energy that may be provided to the one or more electronic devices. In some embodiments, the one or more electronic devices may be distinct from the receiver associated with the one or more electronic devices. In such embodiments, the one or more electronic devices may be connected to the receiver over a wire that conveys converted electrical energy from the receiver to the one or more electronic devices.

Exemplary Modular Antenna Boards and Antennas

Embodiments of a wireless power transmission system includes a transmitter, which is configured to transmit power waves. The transmitter includes one or more transmitter boards. Each of the one or more transmitter boards may include a plurality of ports. Embodiments of the wireless power transmission system further includes a plurality of detachable antenna boards which can be connected to the plurality of ports on an transmitter board of the one or more transmitter boards, and which obviates the need for internal antenna boards on the transmitter. Some embodiments of the present disclosure also allow increased frequency ranges and improved performance by providing an ability to attach additional antenna boards to the transmitter board for transmitting the power waves. Some embodiments of the present disclosure may also include switching circuitry having a microprocessor or a microcontroller, which automatically activates or switches the port on the transmitter board when the antenna board is inserted into a connector on the port. When the antenna board is removed, the port on the transmitter board is deactivated.

Figure 6A:
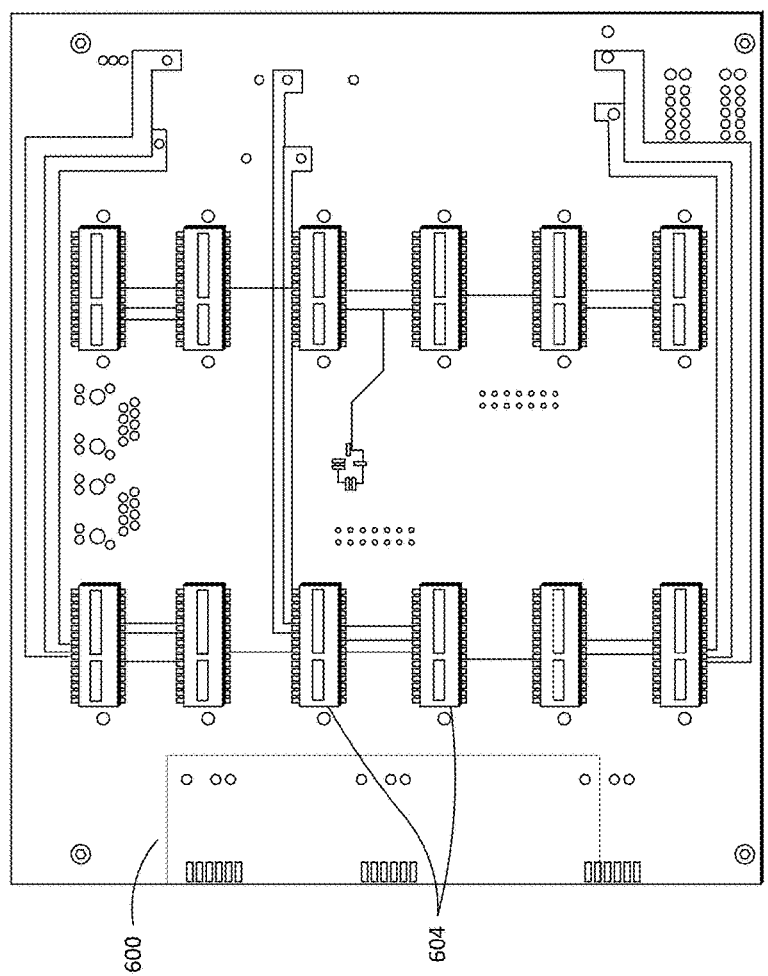
FIG. 6A illustrates a front view of a modular transmitter board of a wireless power transmission system, according to an exemplary embodiment.
Figure 6B:
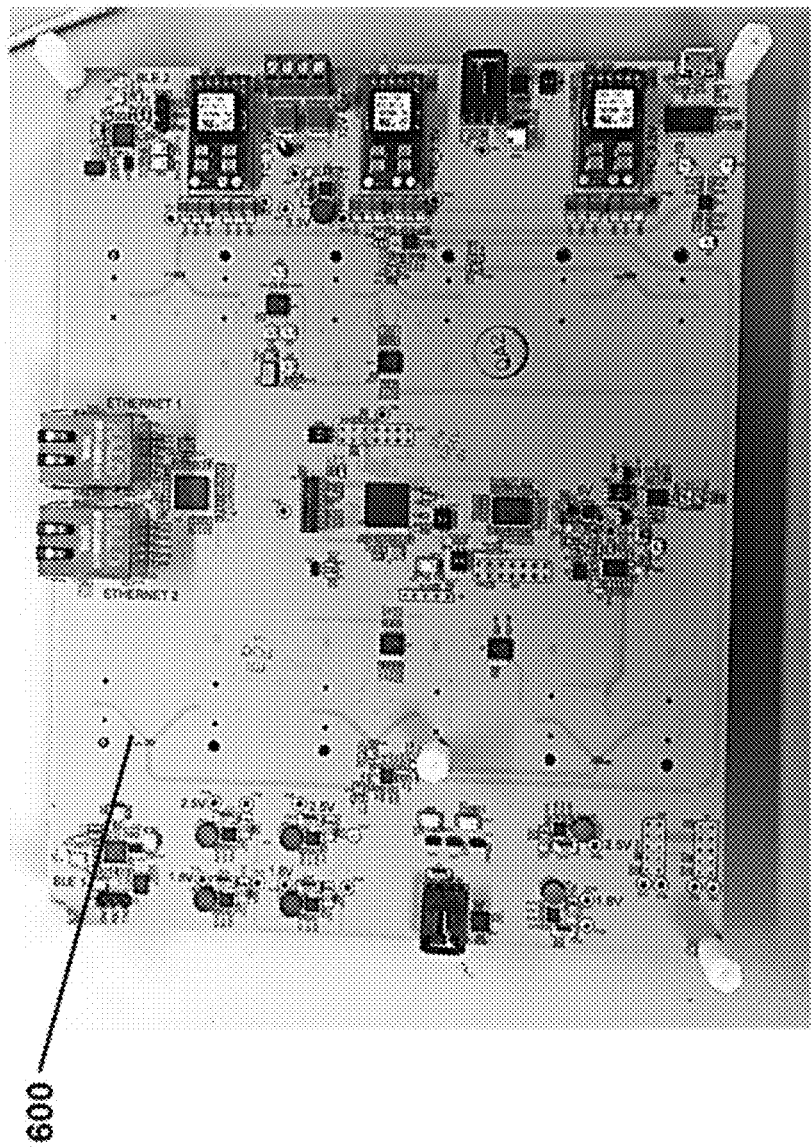
FIG. 6B illustrates a rear view of a modular transmitter board of a wireless power transmission system, according to an exemplary embodiment.
Figure 6C:
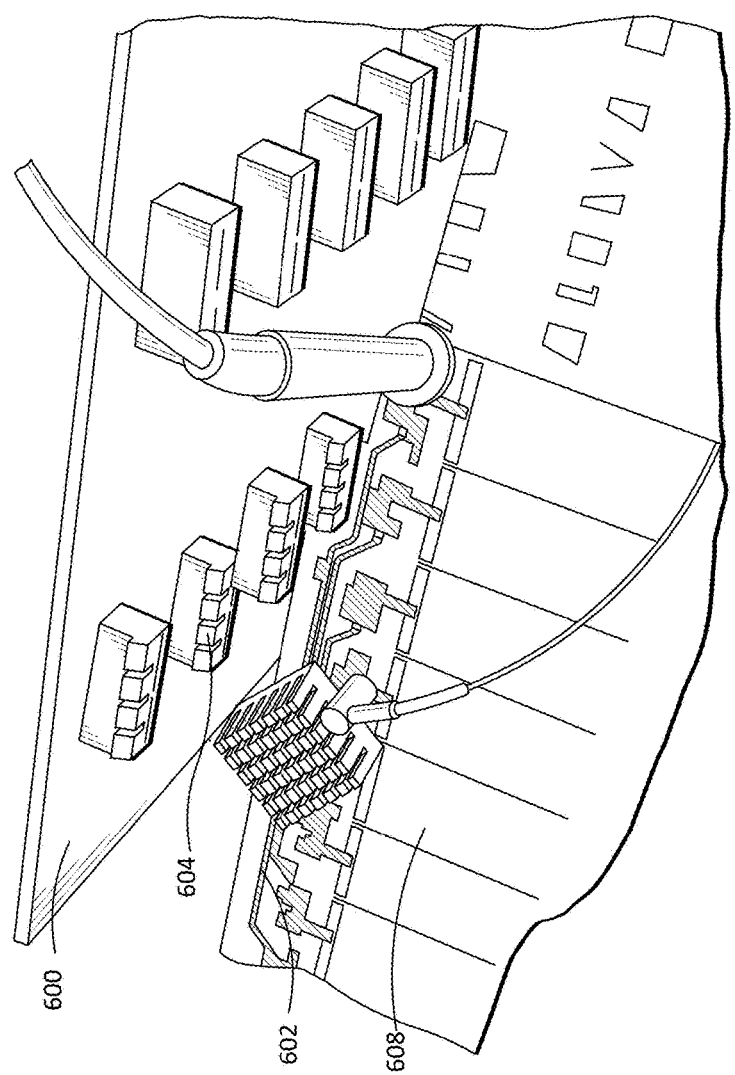
FIG. 6C illustrates a transmitter board having a plurality of ports, and plugging an antenna board into a port of an antenna board of a wireless power transmission system, according to an exemplary embodiment.

FIG. 6A and FIG. 6B illustrates a schematic diagram of a front view and a rear view of a modular transmitter board 600 of a wireless power transmission system, according to an exemplary embodiment. FIG. 6A and FIG. 6B will be explained in conjunction with FIG. 6C that illustrates a schematic diagram plugging of an antenna board 602 into a port 604 of the transmitter board 600 of the wireless power transmission system, according to an exemplary embodiment.

The transmitter board 600 may be built on a printed circuit board (PCB). The transmitter board 600 may include a plurality of ports 604. The plurality of ports 604 are configured to receive a plurality of antenna boards 602. For simplicity of explanation, only one antenna board 602 is shown. Each of the plurality of antenna boards 602 may include a complimentary port that is plugged into the port 604 of the plurality of ports on each of the one or more transmitter boards 600. In one example, a coupling feature may be provided on each antenna board 602 that aligns with a similar corresponding feature on the inside of the port 604. In one example, each coupling feature may comprise a plate with dimensions generally matching those of the corresponding feature (opening) in the port and a tab to make contact to the transmitter board 600.

Each antenna board 602 may further include a plurality of antenna elements 608 configured to transmit one or more types of the power waves. The antenna elements 608 may be selected from the group consisting of ceramic antennas, yagi antenna, tapered antenna, patch antenna, or the like. In some embodiments, the antenna board 602 may include antenna elements, and one or more integrated circuits controlling the behavior of the antenna elements, such as generating the power waves having predetermined characteristics (e.g., amplitude, frequency, trajectory, phase). The antenna elements may transmit the power waves having the predetermined characteristics, such that the power waves arrive at a given location within a transmission field of a transmitter, and exhibit those characteristics. It should be appreciated that, although the exemplary wireless power transmission system describes radio-frequency based power waves, additional or alternative wave-based technologies may be used (e.g., ultrasonic, infrared, magnetic resonance) to wirelessly transmit the power waves from the transmitter to the receiver.

In one embodiment, each of the plurality of ports 604 may correspond to a connector member. The connector member may be secured to the transmitter board 600 and the antenna board 602 may be removably connectable to the connector member. Preferably, the connector member may be permanently attached to the transmitter board 600 such that at least partial disassembly of the transmitter board 600 may be required to remove the connector member. However, it should be understood that in some embodiments, the connector member may be attached to the transmitter board 600 in a different manner.

The antenna board 602 is configured to be detachable from the connector member to enable replacement of the antenna board 602 in the event antenna board 602 is damaged or becomes unworkable. Furthermore, if excessive force is applied to the antenna board 602, the antenna board 602 is configured to separate from the connector member, thereby reducing the likelihood of damage to the antenna board 602 and/or other components of the transmitter that may otherwise result if excessive force is applied to antenna board 602.

In another embodiment, removable antenna board 602 for the transmitter is provided. The removable antenna board 602 may be removably connected to the transmitter board 600. The antenna board 602 and the transmitter board 600 may have corresponding coupling structures. The coupling structures may be flexible and may removably connect the antenna board 602 to the transmitter board 600. The flexible coupling structures may be integrated into the structure of the antenna board 602 and the structure of the transmitter board 600. In one suitable arrangement, the coupling structures may be formed in distinct portions of the antenna board 602 and the transmitter board 600. At least one of the coupling structures maybe formed from a flexible material (i.e., an elastic material). Because the antenna board 602 is removably connected to the transmitter board 600 with the flexible elastic coupling structures, the antenna board 602 may be removed from the transmitter board 600 without damaging the antenna board 602, the transmitter board 600, or the flexible coupling structures. The coupling of the antenna board 602 to the transmitter board 600 may facilitate easy replacement of the antenna board 602 and easy addition of the antenna board 602 whenever there are more receivers to be charged.

The antenna board 602 may also be mechanically and electrically connected to the transmitter board 600 using a coupling structure and a corresponding coupling structure on antenna board 602. The coupling structure and the corresponding coupling structure on antenna board 602 may be used to connect communications path between the transmitter board 600 and the antenna board 602. The coupling structures may be configured to allow the antenna board 602 to move about an axis. The antenna board 602 may move about the axis from an original position into an extended position or move from the extended position into the original position. The coupling structures may be configured to connect an antenna board 602 to the transmitter board 600 in such a way as the antenna board 602 is not released during operations, for example, while moving the antenna board 602 around an axis. In one example, the coupling structure may be a rectangular port. The coupling structure may be formed in a rectangular shape with an elastic material. In another example, the coupling structure may be formed in any suitable shape such as a pentagon, hexagon, etc. The coupling structure may connect with a corresponding coupling structure in the antenna board 602 such that a hole or depression in the coupling structure is mated with the tab (corresponding coupling structure) in the antenna board 602.

In another embodiment, magnetic coupling port on the transmitter board 600 and corresponding magnetic coupling port on the antenna board 602 may provide a magnetic attraction force between the transmitter board 600 and the antenna board 602. The magnetic attraction force provided by magnetic coupling ports may hold the antenna board 602 onto the transmitter board 600. The coupling structures or portions of the coupling structures) may be made of one or more magnetic elements (magnets) and/or one or more ferromagnetic elements (e.g., iron bars). The magnetic or ferromagnetic portions of the coupling structures may produce a magnetic force that holds the antenna board 602 to the transmitter board 600. The magnetic coupling ports and other coupling structures discussed in the present disclosure may be configured to provide feedback to a user when the antenna board 602 is connected or disconnected from the transmitter board 600. For example, the magnetic coupling ports may be configured to make a noise when the antenna board 602 is connected to or disconnected from the transmitter board 600.

The transmitter may have sensors to determine whether the antenna board 602 is attached to or detached from the transmitter board 600. A communications path may be used to convey signals between the sensors and a processor of the transmitter. The communications path may be implemented using any suitable cable or wires or printed connections on the PCB. In one embodiment, the microprocessor on receiving a notification from the sensor that the antenna board 602 is attached to the transmitter board 600, the processor activates the port 604 of the transmitter board 600 in which the antenna board 602 is plugged. On activation of the port 604, an electrical coupling occurs between the antenna board 602 and the port 604 in which the antenna board 602 is plugged, and the antennas of the antenna board 602 are activated for transmission of the power waves. In another embodiment, the microprocessor on receiving a notification from the sensor that the antenna board 602 is detached from the transmitter board 600, the processor deactivates the port 604 of the transmitter board 600 from which the antenna board 602 is unplugged.

The processor of the transmitter may include suitable logic, circuitry, and interfaces that are operable to execute one or more instructions to perform predetermined operations on receiving the inputs from the sensors. The processor can be realized through a number of processor technologies known in the art. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor, among others. The processor may also include a Graphics Processor (GPU) that executes the set of instructions to perform one or more processing operations associated with handling various forms of graphical data, such as data received from a visual or thermal camera, or to produce a graphical user interface (GUI) allowing a user to configure and manage operation.

In another embodiment, the processor is further configured to automatically detect a new antenna board connected to an empty port of the plurality of ports. Based on the detection of the new antenna board being connected, the processor may then re-configure selection parameters for activating the new antenna board. Similarly, the processor may re-configure waveform generation parameters applied during power wave generation and transmission. The processor while reconfiguring the selection parameters takes into consideration operation of other antenna boards so that their respective power waves do not interact in an undesired manner or create unwanted interference. The transmitter may also include a timing circuit. When the new antenna board is connected to the transmitter board 600, the processor may update trigger timings of all the antenna boards in the timing circuit and include the trigger time for the new antenna board. Based on the position of the receiver, the processor may control the trigger timing such that the one or more antennas of each antenna board are configured to transmit the one or more power waves at the same time or a different time from each other based on the position of the identified receiver. The timing circuit may also be used to select a different transmission time for each antenna board.

Figure 7:
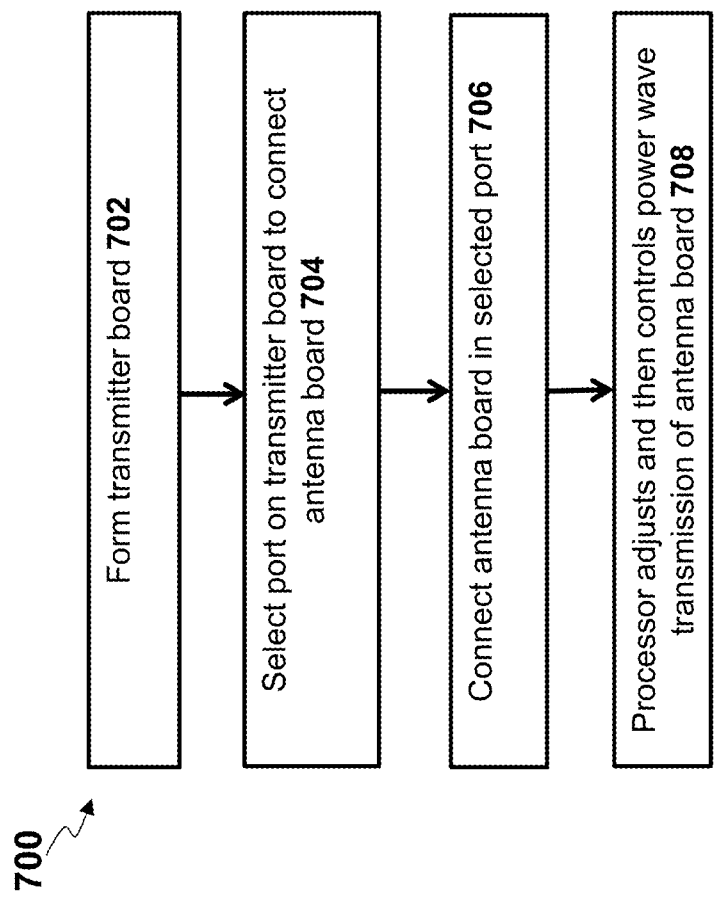
FIG. 7 is a flow diagram depicting coupling of antenna arrays into antenna board in a wireless power transmission system, according to an exemplary embodiment.

FIG. 7 is a flow diagram depicting coupling of antenna arrays with antenna board in a wireless power transmission system, according to an exemplary embodiment.

At step 702, form transmitter board. The transmitter board may be formed to build a variety of devices and circuitry for the wireless power transmission system. In an embodiment, the transmitter board comprises a power feeding line and one or more ports.

At step 704, select port on the transmitter board to removably connect at least one antenna board. The antenna board comprises one or more antenna elements configured to transmit power waves.

At step 706, connect the at least one antenna board in selected port. The antenna board including one or more antenna elements is connected in the selected port. The connection between the antenna board and the port on the transmitter board is removable; the at least one antenna board is also connected to the power feeding line of the transmitter board.

At step 708, control by a processor transmission of the one or more power waves via the antenna boards connected to the respective ports to form a pocket of energy within a transmission field of the transmitter. In an embodiment, the processor is also configured to selectively activate antenna boards of the plurality of antenna boards that are connected to respective ports of the plurality of ports. In another embodiment, the processor is further configured to automatically detect a new antenna board connected to an empty port of the plurality of ports.

In an embodiment, the transmitter of the wireless power transmission system adheres to electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for MPE, and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per area. For example, power density can be commonly expressed in terms of watts per square meter ($W/m^2$), milliwatts per square centimeter ($mW/cm^2$), or microwatts per square centimeter ($\mu W/cm^2$).

The transmitter of the wireless power transmission incorporate various safety techniques to ensure that human occupants in or near a transmission field are not exposed to EMF energy near or above regulatory limits or other nominal limits. One safety method is to include a margin of error (e.g., about 10% to 20%) beyond the nominal limits in deciding to avoid, reduce, or cease transmission, so that human subjects are not exposed to power levels at or near the EMF exposure limits. A second safety method can provide staged protection measures, such as reduction or termination of wireless power transmission if humans (and in some embodiments, other living beings or sensitive objects) move toward a pocket of energy with power density levels exceeding EMF exposure limits.

The antenna element structures and wireless communications devices may support communications over any suitable wireless communications bands. For example, wireless communications devices may be used to cover communications frequency bands such as the cellular telephone bands at 850 MHz, 900 MHz, 1800 MHz, and 1900 MHz, data service bands such as the 3G data communications band at 2100 MHz (commonly referred to as UMTS or Universal Mobile Telecommunications System), Wi-Fi® (IEEE 802.11) bands at frequencies such as 2.4 GHz and 5.0 GHz (also sometimes referred to as wireless local area network or WLAN bands), the Bluetooth® band at 2.4 GHz, and the global positioning system (GPS) band at 1575 MHz. A communications device can cover these communications bands and/or other suitable communications bands with proper configuration of the antenna structures in wireless communications circuitry).

Figure 8:
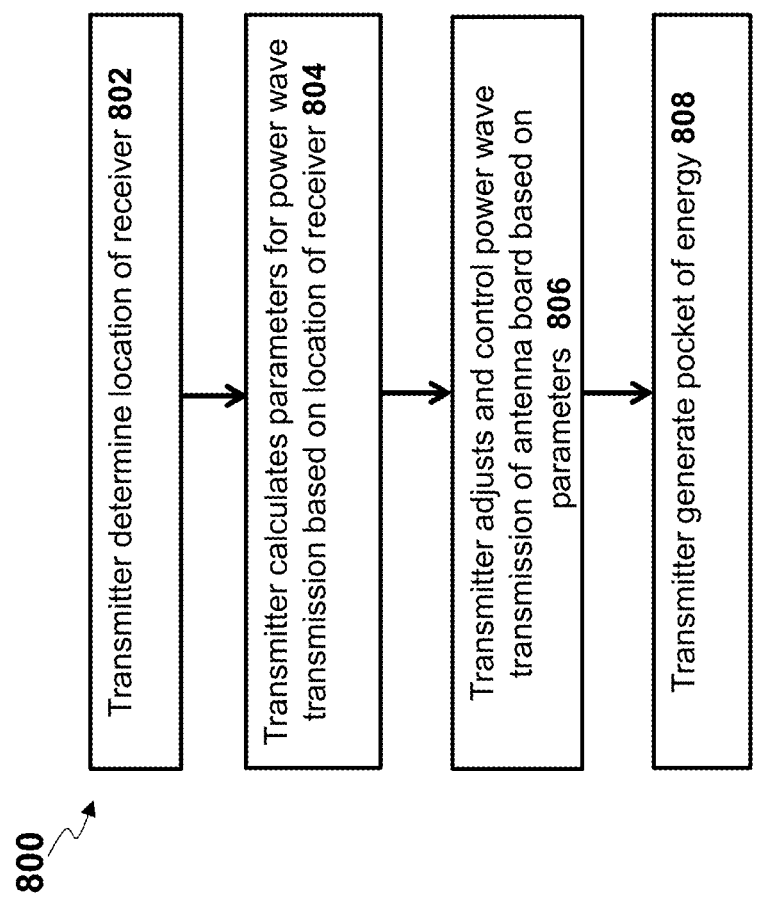
FIG. 8 is a flow diagram operation of a wireless power transmission system, according to an exemplary embodiment.

FIG. 8 is a flow diagram operation of a wireless power transmission system, according to an exemplary embodiment.

In a first step 802, a transmitter determines location of a receiver. The transmitter establishes a connection with the receiver. The transmitter and receiver may communicate information and data using a wireless communication protocol capable of transmitting information between two processors of electrical devices such as Bluetooth. For example, the transmitter may scan for receiver's broadcasting signals or a receiver may transmit a signal to the transmitter. The signal may announce the receiver's presence to the transmitter, and may trigger an association between the transmitter and the receiver. Once the transmitter identifies the location of the receiver, the transmitter may establish the connection associated in the transmitter with the receiver, allowing the transmitter and receiver to communicate signals. The transmitter may also receive data from one or more sensors about a location of the receiver.

In a next step 804, the transmitter may determine parameters for power wave transmission based on the location of the receiver. In one embodiment, a processor of the transmitter may execute one or more software modules in order to analyze the received data corresponding to location of the receiver, and based on the analysis identify one or more parameters. The one or more parameters act as an input to the processor to make the necessary selections to form the pocket of energy at the location of receiver. The one or more parameters correspond to a waveform to be generated by a waveform generator, an output frequency of the waveform, shape of antenna arrays in an antenna board, and spacing of the antennas in the antenna array to form the pocket of energy at the targeted location of the receiver.

At step 806, control by a processor of a transmitter transmission of power waves via antenna boards (having antenna elements) connected to respective ports on a transmitter board to form a pocket of energy within a transmission field of the transmitter. In an embodiment, the processor is configured to selectively activate antenna boards of the plurality of antenna boards that are connected to respective ports of the plurality of ports of the transmitter board based on the determined parameters or the location of the receiver.

The transmitter algorithms based on the one or more parameters may also vary production and transmission of power transmission signals by the antenna elements of the antenna board to optimize the pocket of energy around the receiver. For example, the transmitter may adjust the phase at which the antenna elements transmits the power transmission signals, until that power received by the receiver indicates an effectively established pocket energy around the receiver. When an optimal configuration for the antennas is identified, memory of the transmitter may store the configurations to keep the transmitter broadcasting at that highest level.

The algorithms of the transmitter based on the parameters may further determine when it is necessary to adjust the power transmission signals and may also vary the configuration of the antenna elements. For example, the transmitter may determine the power received at a receiver is less than maximal, based on the parameters. The transmitter may then adjust the phase of the power transmission signals, but may also simultaneously continues to generate the new parameters based on the information and data being reported back from receiver and the sensor devices.

In the next step 808, the transmitter will generate the pocket of energy for the receiver. The receiver may be electrically connected to the electronic device like a smart phone.

In an embodiment, the transmitter may scan for new receivers at a predetermined interval and thereby generate new parameters. As each new receiver is detected, the new parameters are generated, and based on the new parameters, the transmitter may establish a connection and begin transmitting power transmission signals, accordingly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

What is claimed is:

1. An antenna board for wirelessly delivering power to a receiver device, the antenna board comprising:
   a connector configured to:
      detachably connect with any one of a plurality of electrical ports of a transmitter board, including a first electrical port of the plurality of electrical ports, and
      receive an electrical signal from the first electrical port when the connector is connected with the first electrical port; and
   one or more antenna elements configured to, when the connector is connected with the first electrical port, transmit radio frequency (RF) power transmission waves using the electrical signal received from the first electrical port, wherein:
      each of the RF power transmission waves constructively interferes with at least one other RF power transmission wave of the RF power transmission waves at a receiver device within a transmission field of the antenna board; and
      energy from the RF power transmission waves is used by the receiver device to power and/or charge the receiver device.

2. The antenna board according to claim 1, wherein the transmitter board comprises a processor configured to activate the first electrical port when the connector of the antenna board is connected with the first electrical port.

3. The antenna board according to claim 2, wherein:
   the processor of the transmitter board is further configured to adjust one or more transmission characteristics of the RF power transmission waves to cause each of the RF power transmission waves to constructively interfere with at least one other RF power transmission wave of the RF power transmission waves at the receiver device; and
   the one or more transmission characteristics of the RF power transmission waves include one or more of phase, amplitude, frequency, and gain.

4. The antenna board according to claim 1, wherein:
   the one or more antenna elements are made of ceramic, and
   the ceramic is alumina.

5. The antenna board according to claim 1, wherein:
   an antenna element of the one or more antenna elements is a resonator element configured to radiate at least some of the RF power transmission waves, and
   the resonator element is embedded in a substrate of the antenna board.

6. The antenna board according to claim 5, wherein:
   the resonator element is cylindrical, and
   the substrate is cylindrical.

7. The antenna board according to claim 1, wherein:
   the one or more antenna elements are embedded in a casting of a dielectric of the antenna board, and
   the casting is silicon.

8. The antenna board according to claim 1, wherein each antenna element of the one or more antenna elements comprises an antenna mount defining an opening configured to operate as a resonator for transmitting at least some of the RF power transmission waves.

9. The antenna board according to claim 8, wherein the resonator is configured as a Yagi antenna.

10. The antenna board according to claim 1, wherein the connector of the antenna board is frictionally engaged to the first electrical port.

11. A method of wirelessly delivering power to a receiver device, the method comprising:
at an antenna board comprising a connector and one or more antenna elements:
connecting, via the connector, the antenna board to a first electrical port of a transmitter board, wherein the transmitter board includes a plurality of electrical boards, including the first electrical port;
after connecting the antenna board to the first electrical port:
receiving an electrical signal from the first electrical port;
transmitting, via the one or more antenna elements, radio frequency (RF) power transmission waves using the electrical signal received from the first electrical port, wherein:
each of the RF power transmission waves constructively interferes with at least one other RF power transmission wave of the RF power transmission waves at a receiver device within a transmission field of the antenna board; and
energy from the RF power transmission waves is used by the receiver device to power and/or charge the receiver device.

12. The method of claim 11, wherein:
the transmitter board further includes a processor; and
the processor of the transmitter board activates the first electrical port after connecting the antenna board to the first electrical port.

13. The method of claim 12, wherein:
the processor of the transmitter board adjusts one or more transmission characteristics of the RF power transmission waves to cause each of the RF power transmission waves to constructively interfere with at least one other RF power transmission wave of the RF power transmission waves at the receiver device; and
the one or more transmission characteristics of the RF power transmission waves include one or more of phase, amplitude, frequency, and gain.

14. The method of claim 11, wherein:
the one or more antenna elements are made of ceramic, and
the ceramic is alumina.

15. The method of claim 11, wherein:
an antenna element of the one or more antenna elements is a resonator element configured to radiate at least some of the RF power transmission waves; and
the resonator element is embedded in a substrate of the antenna board.

16. The method of claim 15, wherein:
the resonator element is cylindrical, and
the substrate is cylindrical.

17. The method of claim 11, wherein:
the one or more antenna elements are embedded in a casting of a dielectric of the antenna board, and
the casting is silicon.

18. The method of claim 11, wherein each antenna element of the one or more antenna elements comprises an antenna mount defining an opening configured to operate as a resonator for transmitting at least some of the RF power transmission waves.

19. The method of claim 11, wherein the connector of the antenna board is frictionally engaged to the first electrical port.

* * * * *

UNITED STATES PATENT AND TRADEMARK OFFICE
CERTIFICATE OF CORRECTION

PATENT NO.       : 10,164,478 B2
APPLICATION NO.  : 15/059418
DATED            : December 25, 2018
INVENTOR(S)      : Leabman Page 1 of 1

It is certified that error appears in the above-identified patent and that said Letters Patent is hereby corrected as shown below:

In the Claims

Claim 11, Column 23, Line 13, please delete "boards, including" and insert --ports, including--.

Signed and Sealed this
Fifth Day of March, 2019

Andrei Iancu
*Director of the United States Patent and Trademark Office*